United States Patent
Mogi et al.

(10) Patent No.: US 7,054,893 B2
(45) Date of Patent: May 30, 2006

(54) METHOD AND APPARATUS FOR RELOCATING DATA RELATED TO DATABASE MANAGEMENT SYSTEM

(75) Inventors: Kazuhiko Mogi, Yokohama (JP);
Takashi Oeda, Sagamihara (JP);
Masaru Kitsuregawa, Matsudo (JP)

(73) Assignee: Hitachi, Ltd., Tokyo (JP)

( * ) Notice: Subject to any disclaimer, the term of this patent is extended or adjusted under 35 U.S.C. 154(b) by 368 days.

(21) Appl. No.: 10/084,540

(22) Filed: Feb. 28, 2002

(65) Prior Publication Data

US 2003/0093439 A1     May 15, 2003

(30) Foreign Application Priority Data

Nov. 12, 2001  (JP)  ............................. 2001-345523

(51) Int. Cl.
G06F 17/00        (2006.01)
(52) U.S. Cl. .................... 707/205; 707/200; 707/204
(58) Field of Classification Search .............. 707/1–10, 707/20–206; 711/160, 114
See application file for complete search history.

(56) References Cited

U.S. PATENT DOCUMENTS

| | | | | |
|---|---|---|---|---|
| 5,131,087 A | * | 7/1992 | Warr ............................ | 707/205 |
| 5,317,727 A | * | 5/1994 | Tsuchida et al. ............... | 707/2 |
| 5,333,315 A | * | 7/1994 | Saether et al. ............... | 707/204 |
| 5,506,986 A | * | 4/1996 | Healy ........................... | 707/204 |
| 5,590,318 A | * | 12/1996 | Zbikowski et al. .......... | 707/202 |
| 5,734,822 A | * | 3/1998 | Houha et al. ................ | 717/167 |
| 5,806,065 A | * | 9/1998 | Lomet ............................ | 707/3 |
| 5,873,103 A | * | 2/1999 | Trede et al. ................. | 707/204 |
| 5,918,225 A | * | 6/1999 | White et al. .................... | 707/3 |
| 5,960,437 A | * | 9/1999 | Krawchuk et al. ........... | 707/102 |
| 5,987,506 A | * | 11/1999 | Carter et al. .................. | 707/10 |
| 6,021,408 A | * | 2/2000 | Ledain et al. ................ | 707/201 |
| 6,029,168 A | * | 2/2000 | Frey .............................. | 707/10 |
| 6,035,306 A | * | 3/2000 | Lowenthal et al. .......... | 707/200 |
| 6,330,572 B1 | * | 12/2001 | Sitka ........................... | 707/205 |

(Continued)

FOREIGN PATENT DOCUMENTS

JP         9-274544          9/1997

(Continued)

OTHER PUBLICATIONS

Institute of Electronics, Information and Communication Engineers, The Technical Group on Data Engineering, 11th Data Engineering Workshop, Collected Papers Lecture No. 3B-3, Jul. 2000, Mukai et al, "Evaluation of Prefetch Mechanism Using Access Plan on Intelligent Disk". (with English Abstract).

(Continued)

Primary Examiner—Jean M. Corrielus
Assistant Examiner—Anh Ly
(74) Attorney, Agent, or Firm—Mattingly, Stanger, Malur & Brundidge, P.C.

(57) ABSTRACT

A data storage position management main program collects volume physical storage position management information and physical storage apparatus operation information from a storage apparatus, and stores them as storage apparatus arrangement information and storage apparatus operation information. The program also collects necessary information from schema information in a DBMS, stores it as DBMS schema information, collects mapping information in a host and virtual volume information in a virtual volume switch, stores them as data storage position management information, acquires execution history information from the host, and stores it as a DBMS execution history information. The program determines a data relocation plan having a better performance characteristic on the basis of the above information.

10 Claims, 31 Drawing Sheets

U.S. PATENT DOCUMENTS

| | | |
|---|---|---|
| 6,446,161 B1 * | 9/2002 | Yamamoto et al. ......... 711/114 |
| 6,711,649 B1 * | 3/2004 | Bachmat et al. ............ 711/114 |
| 6,766,430 B1 * | 7/2004 | Arakawa et al. ............ 711/165 |
| 6,928,450 B1 * | 8/2005 | Mogi et al. ................. 707/102 |
| 2001/0047360 A1 * | 11/2001 | Huras et al. ................ 707/102 |
| 2001/0054133 A1 * | 12/2001 | Murotani et al. ........... 711/114 |
| 2001/0056438 A1 * | 12/2001 | Ito ............................. 707/204 |
| 2004/0236772 A1 * | 11/2004 | Arakawa et al. ............ 707/100 |
| 2005/0228949 A1 * | 10/2005 | Yamamoto et al. ......... 711/114 |

FOREIGN PATENT DOCUMENTS

JP        2001-67187        3/2001

OTHER PUBLICATIONS

Oracle Corp., "Designing and Tuning for Performance Release 2", Chapter 20, (8.1.6) (with English language original).

* cited by examiner

FIG.2

PHYSICAL STORAGE DEVICE OPERATION INFO. — 32

| VOLUME NAME (501) | PHYSICAL STORAGE DEVICE NAME (502) | CUMULATIVE OPERATION TIME (503) |
|---|---|---|
| Vol0-0 | Pdisk0-0 | 23417390 |
|  | Pdisk0-1 | 38902849 |
| Vol0-1 | Pdisk0-0 | 8290181 |
|  | Pdisk0-1 | 13908202 |

FIG.3

VOLUME PHYSICAL STORAGE POSITION MANAGEMENT INFO. — 36

VOLUME PHYSICAL STORAGE POSITION MAIN INFO. — 510

| VOLUME NAME (501) | VOLUME LOGICAL BLOCK NUMBER (512) | PHYSICAL STORAGE DEVICE NAME (502) | PHYSICAL BLOCK NUMBER (514) |
|---|---|---|---|
| Vol0-0 | 0-10239 | Pdisk0-0 | 0-10239 |
|  | 10240-20479 | Pdisk0-1 | 0-10239 |
| Vol0-1 | 0-10239 | Pdisk0-0 | 10240-20479 |
|  | 10240-20479 | Pdisk0-1 | 10240-20479 |
| ⋮ | ⋮ | ⋮ | ⋮ |
| Empty |  | Pdisk0-0 | 40960-122880 |
|  |  | Pdisk0-1 | 40960-122880 | — 515

VOLUME DATA MIGRATION MANAGEMENT INFO. — 511

| VOLUME NAME (501) | MIGRATION LOGICAL BLOCK NUMBER (782) | MIGRATION DESTINATION PHYSICAL STORAGE DEVICE NAME (783) | MIGRATION DESTINATION PHYSICAL BLOCK NUMBER (784) | DIFFERENCE MANAGEMENT INFO. (785) | COPY POINTER (786) |
|---|---|---|---|---|---|
| Vol0-1 | 8192-10239 | Pdisk0-1 | 38912-40559 | 0 1 ⋯ 0 | 9840 |
| Vol0-2 | 0-8191 | Pdisk0-1 | 30720-38911 | 0 0 ⋯ 1 | 1792 |
| ⋮ | ⋮ | ⋮ | ⋮ | ⋮ | ⋮ |

FIG.5

TABLE DEFINITION INFO. — 551

Table T1 (
 Key1   Numeric(10)
 A      Char(16)
 B      Numeric(10.2)
)
primary key Key1

Table T2 (
 Key1   Numeric(10)
 Key2   Numeric(12)
 C      VarChar(128)
)
primary key Key2
foreign key Key1 ref.T1.Key1

...

INDEX DEFINITION INFO. — 552

| Unique Tree Index Ind1-1 on T1(Key1) | BitMap Index Ind1-2 on TI(A) | Unique Tree Index Ind2-1 on T2(Key2) | ... |

LOG INFO. — 553

Log 1 | Log 2 | Log 3

TEMPORARY TABLE REGION INFO. — 554

Temp 1 | Temp 2

MAXIMUM ACCESS PARALLELISM INFO. — 557

| DATA STRUCTURE NAME | T1 | T2 | ... | Ind1-1 | ... | Temp 1 | ... |
|---|---|---|---|---|---|---|---|
| MAXIMUM ACCESS PARALLELISM | 2 | 4 | ... | 4 | ... | 4 | ... |

(561, 569)

DATA STORAGE POSITION INFO. — 555

| DATA STRUCTURE NAME (561) | DATA FILE PATH NAME (562) | FILE BLOCK NUMBER (563) |
|---|---|---|
| T1 | /dev/rdsk/lvol 0 | 0-499 |
| T1 | /dev/rdsk/lvol 0 | 2000-2499 |
| T2 | /dev/rdsk/lvol 0 | 500-799 |
| ⋮ | ⋮ | ⋮ |
| Ind1-1 | /dev/rdsk/lvol 1 | 5000-7499 |
| ⋮ | ⋮ | ⋮ |
| Log 1 | /dev/rdsk/lvol 1 | 0-999 |
| ⋮ | ⋮ | ⋮ |
| Temp 1 | /dev/rdsk/lvol 1 | 3000-4999 |
| ⋮ | ⋮ | ⋮ |

CACHE STRUCTURE INFO. — 556

| GROUP NAME (565) | CACHE SIZE (566) | ASSIGNED DATA STRUCTURE NAME (567) |
|---|---|---|
| High | 10000 blocks | T1, Ind1-1, Ind1-2 |
| Middle | 5000 blocks | T2, Ind1-2, Ind2-1,... |
| Low | 1000 blocks | T3, Ind3-1,... |

SCHEMA INFO. — 114

FIG.6

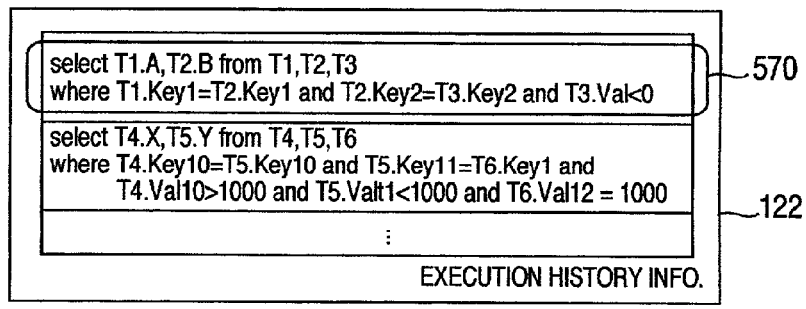

570:
select T1.A,T2.B from T1,T2,T3
where T1.Key1=T2.Key1 and T2.Key2=T3.Key2 and T3.Val<0

122:
select T4.X,T5.Y from T4,T5,T6
where T4.Key10=T5.Key10 and T5.Key11=T6.Key1 and
    T4.Val10>1000 and T5.Val1<1000 and T6.Val12 = 1000
⋮

EXECUTION HISTORY INFO.

FIG.7

| 543 VIRTUAL VOLUME NAME | 544 VIRTUAL VOLUME BLOCK NUMBER | 583 STORAGE DEVICE NAME | 501 VOLUME NAME | 512 VOLUME LOGICAL BLOCK NUMBER |
|---|---|---|---|---|
| Vvol 1 | 0-10239 | Disk0 | Vol0-0 | 0-10239 |
|  | 10240-20479 | Disk1 | Vol1-0 | 0-10239 |
| Vvol 2 | 0-10239 | Disk0 | Vol0-0 | 10240-20479 |
|  | 10240-20479 | Disk2 | Vol2-0 | 0-10239 |
| ⋮ | ⋮ | ⋮ | ⋮ | ⋮ |
| Empty |  | Disk1 | Vol1-0 | 10240-20479 |
|  |  | Disk2 | Vol2-0 | 10240-20479 |

585

VIRTUAL VOLUME STORAGE POSITION INFO.

| 543 VIRTUAL VOLUME NAME | 793 MIGRATION VIRTUAL VOLUME BLOCK NUMBER | 794 MIGRATION DESTINATION STORAGE DEVICE NAME | 795 MIGRATION DESTINATION VOLUME NAME | 796 MIGRATION DESTINATION LOGICAL BLOCK NUMBER | 785 DIFFERENCE MANAGEMENT INFO. | | | 786 COPY POINTER |
|---|---|---|---|---|---|---|---|---|
| Vvol 2 | 8102-10239 | Disk1 | Vol1-1 | 28912-40959 | 0 | 1 | ⋯ 0 | 9840 |
| Vvol 3 | 0-8791 | Disk2 | Vol2-1 | 20720-38911 | 0 | 0 | ⋯ 1 | 1792 |
| ⋮ | ⋮ | ⋮ | ⋮ | ⋮ | ⋮ | | | ⋮ |

VIRTUAL VOLUME DATA MIGRATION MANAGEMENT INFO. 790

VIRTUAL VOLUME INFO. 73 791

FIG.8

| STORAGE DEVICE NAME | Disk0 | Disk0 | Disk0 | ... | Disk2 | ... | 583 |
|---|---|---|---|---|---|---|---|
| VOLUME NAME | Vol0-0 | Vol0-0 | Vol0-1 | ... | Vol2-0 | ... | 501 |
| PHYSICAL STORAGE DEVICE NAME | Pdisk0-0 | Pdisk0-1 | Vdisk0-0 | ... | Pdisk2-0 | ... | 502 |
| OLD CUMULATIVE OPERATION TIME | 23917390 | 38902849 | 8012891 | ... | 128928479 | ... | 503 |
| OPERATION RATE 2000/4/1 12:00~ 2000/4/1 12:15 | 20% | 12% | 4% | ... | 50% | ... | |
| 2000/4/1 12:15~ 2000/4/1 12:30 | 15% | 10% | 7% | ... | 40% | ... | 594 |
| 2000/4/1 12:30~ 2000/4/1 12:45 | 16% | 9% | 5% | ... | 43% | ... | |
| ⋮ | ⋮ | ⋮ | ⋮ | ⋮ | ⋮ | ⋮ | |

PREVIOUS CUMULATIVE OPERATION TIME ACQUISITION TIME — 595

STORAGE DEVICE OPERATION INFO. — 132

FIG.9

| STORAGE DEVICE NAME (583) | MIGRATION FUNCTION INFO. (601) | DATA CACHE CAPACITY (602) | STORAGE DEVICE VOLUME PHYSICAL STORAGE POSITION MANAGEMENT INFO. (603) |
|---|---|---|---|
| Disk0 | | 4096MS | VOLUME PHYSICAL STORAGE POSITION MAIN INFO. 510 IN DISK0 |
| Disk1 | | | STORAGE POSITION INFO. ACCORDING TO KNOWN RULE |
| ⋮ | ⋮ | ⋮ | ⋮ |

STORAGE DEVICE STRUCTURE INFO.

VIRTUAL VOLUME PHYSICAL STORAGE POSITION INFO. — 680

| VIRTUAL VOLUME NAME (543) | VIRTUAL VOLUME BLOCK NUMBER (544) | STORAGE DEVICE NAME (583) | VOLUME NAME (501) | PHYSICAL STORAGE DEVICE NAME (502) | PHYSICAL BLOCK NUMBER (514) |
|---|---|---|---|---|---|
| Vvol 0 | 0-10239 | Disk0 | Vol0-0 | Pdisk0-0 | 0-10239 |
|  | 10240-20479 | Disk1 | Vol1-0 | Pdisk1-0 | 0-10239 |
| Vvol 1 | 0-10239 | Disk0 | Vol0-1 | Pdisk0-0 | 10240-20479 |
|  | 10240-20479 | Disk2 | Vol2-0 | Pdisk2-0 | 0-10239 |
| ⋮ | ⋮ | ⋮ | ⋮ | ⋮ | ⋮ |
| Empty | - | Disk1 | Vol1-0 | Pdisk1-0 | 10240-20479 |
|  | - | Disk2 | Vol2-2 | Pdisk2-0 | 10240-20470 |
|  | - | Disk0 | - | Pdisk0-0 | 40960-122880 |
|  | ⋮ | ⋮ | ⋮ | ⋮ | ⋮ |

681 (Empty rows)

DATA STRUCTURE VIRTUAL-VOLUME POSITION INFO. — 690

| DBMS NAME (631) | DATA STRUCTURE NAME (561) | DATA FILE PATH NAME (562) | FILE BLOCK NUMBER (563) | VIRTUAL VOLUME NAME (543) | VIRTUAL VOLUME BLOCK NUMBER (544) |
|---|---|---|---|---|---|
| DBMS1 | T1 |  | 0-4999 | Vvol0 | 0-4999 |
|  |  |  | 5000-9999 | Vvol1 | 0-4999 |
|  |  |  | 0-9999 | Vvol0 | 10000-19999 |
| ⋮ | ⋮ | ⋮ | ⋮ | ⋮ | ⋮ |
| DBMS2 | T1 |  | 0-29999 | Vvol10 | 0-29999 |
| ⋮ | ⋮ | ⋮ | ⋮ | ⋮ | ⋮ |

DATA RELOCATION WORK INFO. — 670

FIG.16

VIRTUAL VOLUME MIGRATION PLAN INFO.

| MIGRATION SEQUENCE (761) | MIGRATION VIRTUAL VOLUME NAME (762) | MIGRATION VIRTUAL VOLUME BLOCK NUMBER (763) | MIGRATION DESTINATION STORAGE DEVICE NAME (764) | MIGRATION DESTINATION VOLUME NAME (765) | MIGRATION DESTINATION VOLUME LOGICAL BLOCK NUMBER (766) |
|---|---|---|---|---|---|
| 1 | Vvol0 | 8192-10239 | Disk2 | Vol2-1 | 10240-12287 |
| 3 | Vvol2 | 10240-20479 | Disk1 | Vol1-1 | 0-10239 |
| ⋮ | ⋮ | ⋮ | ⋮ | ⋮ | ⋮ |

PHYSICAL STORAGE POSITION MIGRATION PLAN INFO.

| MIGRATION SEQUENCE (761) | MIGRATION STORAGE DEVICE NAME (767) | MIGRATION VOLUME NAME (768) | MIGRATION VOLUME LOGICAL BLOCK NUMBER (769) | MIGRATION DESTINATION PHYSICAL STORAGE DEVICE NAME (771) | MIGRATION DESTINATION PHYSICAL BLOCK NUMBER (772) |
|---|---|---|---|---|---|
| 2 | Disk2 | Vol2-0 | 8192-10239 | Pdisk2-1 | 8192-10239 |
| 5 | Disk2 | Vol3-1 | 0-8192 | Pdisk2-1 | 10240-18431 |
| ⋮ | ⋮ | ⋮ | ⋮ | ⋮ | ⋮ |

MIGRATION PLAN INFO. (750, 751, 752)

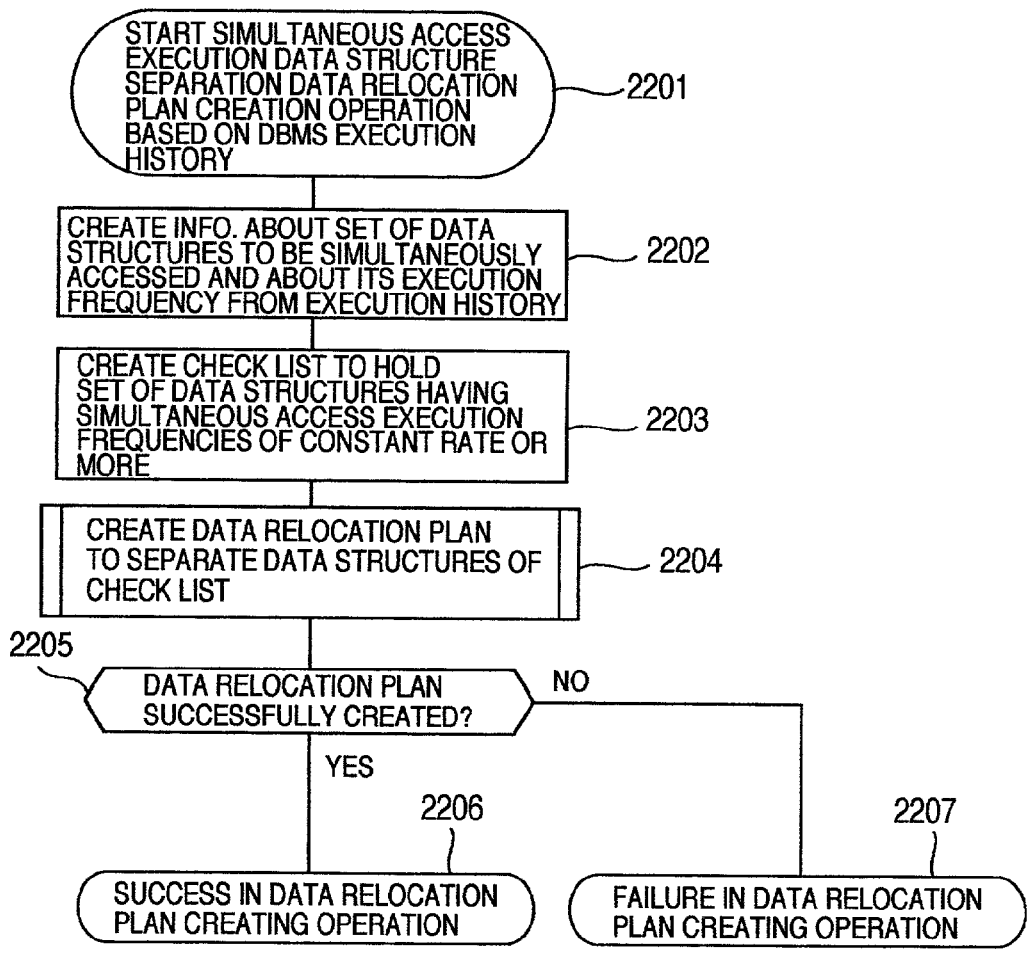

FIG.27

S VOLUME RAW DEVICE INFO. (520b)

| RAW DEVICE PATH NAME | STORAGE DEVICE NAME | RAW DEVICE VOLUME NAME |
|---|---|---|
| /dcv/rdsk/lvol0 | - | Lvol0 |
| /dcv/rdsk/lval1 | - | Lvol1 |
| /dcv/rdsk/vol0-2 | Disk0 | Vol0-2 |
| /dcv/rdsk/vol2-2 | Disk2 | Vol2-2 |

FILE STORAGE POSITION INFO. (503b / 536)

| FILE PATH NAME | FILE SYSTEM ID | FILE BLOCK NUMBER | STORAGE DEVICE NAME | FILE ALLOCATION VOLUME NAME | FILE ALLOCATION VOLUME BLOCK NUMBER |
|---|---|---|---|---|---|
| /DB/data1.dat | 0 | 0-4999 | - | Lvol0 | 1000-5999 |
|  |  | 5000-9999 | - | Lvol0 | 10240-15239 |
| /DB/data2.dat | 1 | 0-9999 | Disk0 | Vol0-1 | 0-9999 |
|  |  | 10000-14999 | Disk2 | Vol2-1 | 15000-19999 |
| tempty | 0 | - | - | Lvol0 | 15240-20479 |
|  | 1 | - | Disk2 | Vol2-1 | 40960-122880 |

LOGICAL VOLUME STRUCTURE INFO. (540b / 106b)

MAPPING INFO.

| LOGICAL VOLUME NAME | LOGICAL VOLUME LOGICAL BLOCK NUMBER | STORAGE DEVICE NAME | VOLUME NAME | VOLUME LOGICAL BLOCK NUMBER |
|---|---|---|---|---|
| Lvol0 | 0-10239 | Disk0 | Vol0-0 | 0-10239 |
|  | 10240-20479 | Disk0 | Vol0-1 | 0-10239 |
| Lvol1 | 0-10239 | Disk0 | Vol0-0 | 10240-20479 |
|  | 10240-20479 | Disk0 | Vol0-1 | 10240-20479 |

FIG.29

WORK STORAGE DEVICE VOLUME STORAGE POSITION INFO. (682)

| STORAGE DEVICE NAME (583) | VOLUME NAME (501) | VOLUME LOGICAL BLOCK NUMBER (512) | PHYSICAL STORAGE DEVICE NAME (502) | PHYSICAL BLOCK NUMBER (514) |
|---|---|---|---|---|
| Disk0 | Vol0-0 | 0-10239 | Pdisk0-0 | 0-10239 |
|  | Vol0-1 | 0-10239 | Pdisk0-1 | 0-10239 |
| Disk1 | Vol1-0 | 0-10239 | Pdisk1-0 | 0-10239 |
| Disk2 | Vol2-0 | 0-10239 | Pdisk2-0 | 0-10239 |
| ⋮ | ⋮ | ⋮ | ⋮ | ⋮ |

WORK EMPTY AREA INFO.

| DBMS NAME (631) | FILE SYSTEM ID (535) | LOGICAL VOLUME NAME (541) | LOGICAL VOLUME LOGICAL BLOCK NUMBER (542) | STORAGE DEVICE NAME (583) | VOLUME NAME (501) | VOLUME LOGICAL BLOCK NUMBER (512) | PHYSICAL STORAGE DEVICE NAME (502) | PHYSICAL BLOCK NUMBER (514) |
|---|---|---|---|---|---|---|---|---|
| DB_Host1 | 0 | LVol0 | 15000-20479 | Disk0 | Vol0-1 | 4760-10239 | Pdisk0-1 | 15000-20479 |
| DB_Host2 | 1 | - | - | Disk2 | Vol2-1 | 40960-122880 | Pdisk2-1 | 40960-122880 |
| - | - | - | - | Disk2 | Vol2-2 | 0-10239 | Pdisk2-2 | 0-10239 |
| - | - | - | - | Disk0 | - | - | Pdisk0-2 | 40960-122880 |
| ⋮ | ⋮ | ⋮ | ⋮ | ⋮ | ⋮ | ⋮ | ⋮ | ⋮ |

DATA STRUCTURE VIRTUAL-VOLUME POSITION INFO. (683)
DATA RELOCATION WORK INFO. (670b, 690b)

| HOST NAME (631) | DBMS NAME (631) | DATA STRUCTURE NAME (561) | DATA FILE BUS NAME (562) | FILE SYSTEM ID (535) | FILE BLOCK NUMBER (563) | STORAGE DEVICE NAME (583) | VOLUME NAME (501) | VOLUME LOGICAL BLOCK NUMBER (512) |
|---|---|---|---|---|---|---|---|---|
| DB_Host1 | DBMS1 | T1 | /DB/data1.dat | 0 | 0-4999 | Disk0 | Vol0-0 | 1000-5999 |
|  |  |  |  |  | 5000-9999 | Disk0 | Vol0-1 | 0-4999 |
|  |  |  | /DB/data2.dat | 1 | 0-9999 | Disk0 | Vol0-1 | 10000-19999 |
| ⋮ | ⋮ | ⋮ | ⋮ | ⋮ | ⋮ | ⋮ | ⋮ | ⋮ |
| DB_Host2 | DBMS2 | Ti | /dcv/rdsk/lvol1 | - | 0-29999 | Disk2 | Vol2-0 | 0-29999 |
| ⋮ | ⋮ | ⋮ | ⋮ | ⋮ | ⋮ | ⋮ | ⋮ | ⋮ |

FIG.30

LOGICAL VOLUME MIGRATION PLAN INFO.

| MIGRATION SEQUENCE (761) | DBMS NAME (631) | MIGRATION LOGICAL VOLUME NAME (773) | MIGRATION LOGICAL VOLUME BLOCK NUMBER (774) | MIGRATION DESTINATION STORAGE DEVICE NAME (764) | MIGRATION DESTINATION VOLUME NAME (765) | MIGRATION DESTINATION VOLUME LOGICAL BLOCK NUMBER (766) |
|---|---|---|---|---|---|---|
| 1 | DB_Host1 | Lvol0 | 8192-10239 | Disk2 | Vol2-1 | 10240-12287 |
| 4 | DB_Host2 | Lvol2 | 10240-20479 | Disk2 | Vol2-1 | 0-10239 |
| ⋮ | ⋮ | ⋮ | ⋮ | ⋮ | ⋮ | ⋮ |

(753)

FILE BLOCK MIGRATION PLAN INFO.

| MIGRATION SEQUENCE (761) | HOST NAME (631) | FILE SYSTEM ID (535) | MIGRATION DATA FILE PATH NAME (775) | MIGRATION FILE BLOCK NUMBER (776) | MIGRATION DESTINATION STORAGE DEVICE NAME (764) | MIGRATION DESTINATION VOLUME NAME (765) | MIGRATION DESTINATION VOLUME LOGICAL BLOCK NUMBER (766) |
|---|---|---|---|---|---|---|---|
| 3 | DB_Host1 | 1 | /DB/data2.dat | 8192-10239 | Disk2 | Vol2-1 | 40960-43007 |
| 5 | DB_Host1 | 0 | /DB/data1.dat | 1000-5999 | - | LVol0 | 15240-20219 |
| ⋮ | ⋮ | ⋮ | ⋮ | ⋮ | ⋮ | ⋮ | ⋮ |

(754)

PHYSICAL STORAGE POSITION MIGRATION PLAN INFO.

| MIGRATION SEQUENCE (761) | MIGRATION STORAGE DEVICE NAME (767) | MIGRATION VOLUME NAME (768) | MIGRATION VOLUME LOGICAL BLOCK NUMBER (769) | MIGRATION DESTINATION PHYSICAL STORAGE DEVICE NAME (771) | MIGRATION DESTINATION PHYSICAL BLOCK NUMBER (772) |
|---|---|---|---|---|---|
| 2 | Disk2 | Vol2-0 | 8192-10239 | Pdisk2-1 | 8192-10239 |
| 6 | Disk2 | Vol2-1 | 0-8192 | Pdisk2-1 | 10240-18431 |
| ⋮ | ⋮ | ⋮ | ⋮ | ⋮ | ⋮ |

(752)

MIGRATION PLAN INFO. (750b)

FIG.32

PHYSICAL STORAGE DEVICE INFO. (32c)

| FILE SYSTEM NAME (1001) | PHYSICAL STORAGE DEVICE NAME (502) | CUMULATIVE OPERATION TIME (503) |
|---|---|---|
| FS0-0 | Pdisk0-0 | 23917390 |
| FS0-0 | Pdisk0-1 | 38902849 |
| FS0-1 | Pdisk0-0 | 8290181 |
| FS0-1 | Pdisk0-1 | 13908202 |

FIG.33

FILE STORAGE MANAGEMENT INFO. (511c, 36c)

FILE PHYSICAL STORAGE POSITION INFO. (510c)

| FILE SYSTEM NAME (1001) | FILE PATH NAME (1002) | FILE BLOCK NUMBER (1003) | PHYSICAL STORAGE DEVICE NAME (502) | PHYSICAL BLOCK NUMBER (514) |
|---|---|---|---|---|
| FS0-0 | /control.dat | 0-1023 | Pdisk0-0 | 4096-5119 |
| FS0-0 | /VF/VF1.dat | 0-2047 | Pdisk0-1 | 1024-3071 |
| FS0-0 | /VF/VF1.dat | 2048-4095 | Pdisk0-0 | 8192-10239 |
| FS0-0 | Empty | - | Pdisk0-0 | 40960-122880 |
| FS0-1 | /VF/VF3.dat | 0-10239 | Pdisk0-1 | 10240-20479 |
| ⋮ | ⋮ | ⋮ | ⋮ | ⋮ |

(1015)

FILE DATA MIGRATION MANAGEMENT INFO.

| FILE SYSTEM NAME (1001) | FILE PATH NAME (1002) | MIGRATION FILE BLOCK NUMBER (1021) | MIGRATION DESTINATION PHYSICAL STORAGE DEVICE NAME (783) | MIGRATION DESTINATION PHYSICAL BLOCK NUMBER (784) | DIFFERENCE MANAGEMENT INFO. (785) | COPY POINTER (786) |
|---|---|---|---|---|---|---|
| FS0-1 | /data1.dat | 8192-10239 | Pdisk0-1 | 38912-40959 | 0 1 ⋯ 0 | 9840 |
| FS0-2 | /dataA.dat | 0-8191 | Pdisk0-1 | 30720-38911 | 0 0 ⋯ 1 | 1709 |
| ⋮ | ⋮ | ⋮ | ⋮ | ⋮ | ⋮ | ⋮ |

FIG.35

| STORAGE DEVICE NAME | Disk0 | Disk0 | Disk0 | ... | Disk2 | ... | 583 |
|---|---|---|---|---|---|---|---|
| FILE SYSTEM NAME | Vol0-0 | Vol0-0 | Vol0-1 | ... | Vol2-0 | ... | 1001 |
| PHYSICAL STORAGE DEVICE NAME | Pdisk0-0 | Pdisk0-1 | Pdisk0-0 | ... | Pdisk2-0 | ... | 502 |
| OLD CUMULATIVE OPERATION TIME | 23917390 | 38902849 | 8012891 | ... | 128928479 | ... | 593 |
| OPERATION RATE 2000/4/1 12:00~2000/4/1 12:15 | 20% | 12% | 4% | ... | 50% | ... | |
| 2000/4/1 12:15~2000/4/1 12:30 | 15% | 10% | 7% | ... | 40% | ... | 594 |
| 2000/4/1 12:30~2000/4/1 12:45 | 16% | 9% | 5% | ... | 43% | ... | |
| ⋮ | ⋮ | ⋮ | ⋮ | ⋮ | ⋮ | ⋮ | |

PREVIOUS CUMULATIVE OPERATION TIME ACQUISITION TIME — 595

STORAGE DEVICE OPERATION INFO. — 132c

FIG.36

| STORAGE DEVICE NAME (583) | MIGRATION FUNCTION INFO. (601) | DATA CACHE CAPACITY (602) | STORAGE DEVICE FILE PHYSICAL STORAGE POSITION INFORMATION (604c) |
|---|---|---|---|
| NAS0 | WITH | 4096MB | FILE PHYSICAL STORAGE POSITION INFO. 510C IN NAS0, |
| NAS1 | WITHOUT | 4096MB | FILE PHYSICAL STORAGE POSITION INFO. 510C IN NAS1 |
| ⋮ | ⋮ | ⋮ | |

STORAGE DEVICE STRUCTURE INFO.
134c

FIG.39

VIRTUAL FILE BLOCK MIGRATION PLAN INFO.

| MIGRATION SEQUENCE (761) | HOST NAME (651) | MIGRATION VIRTUAL FILE PATH NAME (1051) | MIGRATION VIRTUAL FILE BLOCK NUMBER (1052) | MIGRATION DESTINATION ALLOCATION FILE PATH NAME (1053) | MIGRATION DESTINATION FILE BLOCK NUMBER (1054) |
|---|---|---|---|---|---|
| 1 | DB_Host1 | /DB/data1.dat | 8192-9999 | /NAS0/FS1/VF/VF1.dat | 0-1807 |
| 3 | DB_Host1 | /DB/data3.dat | 4096-8191 | /NAS0/FS2/VF/VF3.dat | 0-4095 |
| ⋮ | ⋮ | ⋮ | ⋮ | ⋮ | ⋮ |

(755)

PHYSICAL STORAGE POSITION MIGRATION PLAN INFO.

| MIGRATION SEQUENCE (761) | MIGRATION FILE SYSTEM NAME (767) | MIGRATION FILE SYSTEM NAME (1101) | MIGRATION FILE PATH NAME (1102) | MIGRATION FILE BLOCK NUMBER (1103) | MIGRATION DESTINATION PHYSICAL STORAGE DEVICE NAME (771) | MIGRATION DESTINATION PHYSICAL BLOCK NUMBER (772) |
|---|---|---|---|---|---|---|
| 2 | NAS0 | FS0-1 | /VF/VF1.dat | 0-1807 | Pdisk0-1 | 8192-9999 |
| 4 | NAS2 | FS2-2 | /VF/VF3.dat | 0-4095 | Pdisk2-2 | 10240-14335 |
| ⋮ | ⋮ | ⋮ | ⋮ | ⋮ | ⋮ | ⋮ |

(752c)

MIGRATION PLAN INFO. (750c)

METHOD AND APPARATUS FOR RELOCATING DATA RELATED TO DATABASE MANAGEMENT SYSTEM

CROSS-REFERENCE TO RELATED APPLICATION

This application is related to U.S. application Ser. No. 10/083,354, filed Feb. 27, 2002 (now U.S. Pat. No. 2003/0093442), corresponding to Japanese Patent Application No. 2001-345523 filed Nov. 12, 2001, the contents of which are incorporated herein by reference in its entirety.

BACKGROUND OF THE INVENTION

The present invention relates to a database management system (DBMS) and more particularly, to a method for relocating data considering DBMS information.

Nowadays, there exist many applications constructed based on database (DB), and a database management system (DBMS), which is the software that manages the creation and maintenance of DB and offers functions to access data in DB easily is highly important. In particular, since the processing performance of the DBMS also determines the performance of an application used for the DB, an improvement in the processing performance of the DBMS is very vital.

One of features of the DB is to handle a great amount of data. To this end, in most of DBMS execution environments, a storage system having a large capacity or a plurality of storage systems are connected to a computer where the DBMS is executed to store data of the DB on the storage system. For this reason, when DB processing is carried out, an access to the storage system takes place and the performance of the DBMS is determined largely by the data access performance of the storage system. In a DBMS operating system, therefore, it is highly important to optimize the performance of the storage system and in particular, to optimize the location of data to be managed by the DBMS to physical storage devices.

A literature "Desining and Tuning for Performance Release 2 (8.1.6)", A76992-01, Oracle Corp., Chapter 20 (which will be referred to as Document 1) describes I/O tuning in the Oracle8i as a relational DBMS (RDBMS). Described in Document 1 as explanations related to the tuning of internal operation of the RDBMS and the tuning of data location are that a log file is stored in physical storage device separated from another data file, that load balancing works effectively by storing data among disks with striping, that table data and index data related thereto become effective when stored in different physical storage devices, and that data not related to the RDBMS is stored in a different physical storage device.

U.S. Pat. No. 6,035,306 (referred to as Document 2) discloses a technique relating to a performance analysis tool considering mapping between DBMS, file system, volume manager and storage system. The performance analysis tool displays workloads of objects in each layers on a screen. At this time, the tool, considering the above mapping, provides a function of easily displaying a view workloads of objects in other layers associated with the first-mentioned objects. Among ones of the objects of the volume manager layers which are stored in a group of high-load storage devices, the tool also has a function of creating an object relocating plan to migrate a second-high load object to a group of lower-load storage devices.

JP-A-9-274544 (Document 3) discloses a technique for improving the access performance of a storage system wherein logical storage devices to be used by a computer are located to physical storage devices for actual storage of data, by dynamically changing the location of the logical storage devices to the physical storage devices. When part of the data stored in physical storage device having a high workload is migrated to another physical storage device based on the above dynamical data migration function, it prevents a particular physical storage device from having a high workload, thus enhancing the performance when viewed from the entire storage system. Also disclosed in Document 3 is a method for automatically executing operations based on the dynamic location change function for a higher performance.

JP-A-2001-67187 (Document 4) discloses, in a storage system wherein logical storage devices to be accessed by a computer are located to physical storage devices for actual storage of data and which has a function of dynamically changing the location of the logical storage devices to the physical storage devices, a technique which divides the physical storage devices into groups having different attributes, creates a plan of changing the location of the physical storage devices to the physical storage devices considering the group division and automatically changes the location of the logical storage devices according to the location change plan. At the time of creating the location change plan, the physical storage devices are grouped according to the attributes, the location change plan is created to select one of the physical storage devices belonging to the group of the physical storage devices having a suitable characteristics as a location destination of one of the logical storage devices, thereby creating a good location change plan.

Described in Document 1 are items to be considered by an administrator when determining the location of data. At present, there exist storage apparatuses which have many physical storage devices internally and are shared by many computers. In such storage apparatuses, in many cases, the logical storage devices to be recognized by a computer are assigned to the area in the physical storage devices for actual data storage. In the case of using such storage apparatuses, it is difficult for humankind e.g., an administrator to grasp the full situations, and becomes even more difficult to grasp even problems explained in Document 1, if a computer system including such storage apparatuses does not have any support function. Even when he/she can grasp the problems, if the computer system does not have a data migration function, back up and restore operations are required to relocate data on the storage devices which requires a large amount of labor.

The technique described in Document 2 can realize a function of creating a data relocation plan based on the workloads of objects in volume manager layers. When it is desired to obtain a higher access performance from the storage devices, it is required to determine the data location in the storage devices taking features in the DBMS layers into consideration. However, the solution to this aspect is not mentioned in Document 2.

In the techniques described in Documents 3 and 4, since consideration is paid only to the workloads and sequential access performance as features of data, good location cannot be always attained when viewed from the application. For example, in a DBMS, it is often to access table data and index data associated therewith at the same time. Such data might be located to an identical physical storage device. In this case, an access contention takes place, thus undesirably degrading the access performance of the storage system.

SUMMARY OF THE INVENTION

It is therefore a first object of the present invention to realize a computer system which can possess storage devices having an access performance characteristic more preferable to a DBMS, with an improved performance of the DBMS, by determining data storage positions of the storage devices considering characteristics of data to be managed by the DBMS. In a DB system utilizing a plurality of storage devices, in particular, access requests to the storage devices are suitably dispersed to thereby improve the processing performance of the DBMS.

A second object of the present invention is to provide a computer system wherein a DBMS is operating, which can realize data storage position relocating operation for the purpose of attaining a good access performance characteristic of the storage devices with consideration of the characteristic of the DBMS, thus reducing a management cost relating to the performance of the computer system.

When information on the DBMS are concentrated on a single location to determine a data relocation plan and an data migration instruction is issued to conform to the data relocation plan, data location having a more preferable performance characteristic to the DBMS can be realized.

Within the computer system, there may be a possibility that a plurality of DBMS's are operating and a plurality of storage devices are utilized. To avoid this, information relating to the structures of the DBMS's and storage devices and so on are concentrated on a single location and a data relocation plan is created, taking all the information concentrated thereon into account.

Here is one of methods for determining the location of data to be managed by the DBMS. An update log to be written always at the time of a data update is located to a physical storage device different from the other data to avoid a mutual interference, whereby there can be obtained a good performance characteristic to the DBMS. At the same time, when table data and index data to be simultaneously accessed with a very high possibility are located to different physical storage devices, whereby a good performance characteristic to the DBMS can be obtained. Utilizing information relating to the DBMS, an access sequence when data are sequentially accessed is predicted and stored in the physical storage devices so as to hold its structure.

At present, there exist techniques for changing data storage positions in a computer operating system (OS), a switch in a data transfer path and interior of storage devices. Change of the data storage positions is implemented by using these techniques. In this case, a data location change instruction is issued to a part for management of the change of the data storage position in accordance with a data relocation plan determined based on the consideration of the aforementioned items.

The present invention can produce features as follows. First, when the DBMS determines a data storage position in a storage device taking the characteristics of data controlled by the DBMS into consideration, there can be realized a computer system which holds a storage device having an access performance characteristic preferable to the DBMS. As a result, the performance of the DBMS operating in the computer system can be improved. In a DB system utilizing a plurality of storage devices, in particular, access requests to the respective storage devices are suitably dispersed to improve the processing performance of the DBMS.

Second, in a computer system having the DBMS operating therein, for the purpose of realizing data storage position relocating operation to attain a storage device having a good access performance characteristic of a storage device taking the characteristic of the DBMS into consideration, a management cost relating to the performance of the computer system can be reduced. In particular, when the present invention is employed, a relocation plan for the data storage position can be automatically created, thus largely contributing to reduction of the management cost. Further, even in a system where a multiplicity of DBMS's are operating and a multiplicity of storage devices are present, since the present invention can be used to realize a centralized control, a management cost relating to the performance of such a system can be reduced.

Other objects, features and advantages of the invention will become apparent from the following description of the embodiments of the invention taken in conjunction with the accompanying drawings.

BRIEF DESCRIPTION OF THE DRAWINGS

FIG. 2 shows physical storage device information 32 held in a storage apparatus 10;

FIG. 3 shows volume physical storage position management information 36 held in the storage apparatus 10;

FIG. 5 shows schema information 114 as data and other management data stored in a DBMS 110 and defined and managed therein;

FIG. 6 execution history information 122 stored on a memory 88 of the DB host 80;

FIG. 7 shows virtual volume information 73 possessed by a virtual volume switch 72;

FIG. 8 storage device operation information 132 stored on a data position management server 82;

FIG. 9 shows storage device structure information 134 stored on the data position management server 82;

FIG. 15 shows data relocation work information 670 for use in data allocation analysis/relocation plan creating operation;

FIG. 16 shows migration plan information 750 having a data migration plan created by the data allocation analysis/relocation plan creating operation stored therein;

FIG. 18 shows query execution simultaneous access data count information 700 for use in the data relocation plan creating operation to separate simultaneous access execution data structures based on the execution history information 138;

FIG. 19 is a processing flowchart of data relocation plan creating operation to separate the simultaneous access execution data structures based on the execution history information 138;

FIG. 27 shows mapping information 106*b* stored in the OS 100 of a DB host 80*b*;

FIG. 29 shows data relocation work information 670*b* for use in data allocation analysis/relocation plan creating operation;

FIG. 30 shows migration plan information 750*b* for storing a data migration plan created by data allocation analysis/relocation plan creating operation;

FIG. 32 shows physical storage device information 32*c* held in a storage apparatus 10*c*;

FIG. 33 shows file storage management information 36*c* held in the storage apparatus 10*c*;

FIG. 35 shows storage device operation information 132*c* stored on the data position management server 82*c*;

FIG. 36 shows storage device structure information 134*c* stored on the data position management server 82*c*;

FIG. 39 shows migration plan information 750*c* for use in the data allocation analysis/relocation plan creating operation.

DESCRIPTION OF THE EMBODIMENTS

Embodiments of the present invention will be explained, but it will be appreciated that the present invention is not limited by the shown embodiments.

First Embodiment

In the present embodiment, there is provided a computer system wherein computers for execution of a DBMS and storage apparatuses are connected by a switch, a computer for management of data storage position is present to manage the whole storage position of data in the computer system. In the present embodiment, the switch has a function of combining storage areas provided from the storage devices to create a virtual storage device. The storage apparatuses and switch have a function of dynamically changing the storage position of data.

The computer for management of data storage position acquires information on the DBMS, information on mapping of the data storage position, and information on storage system structure; and creates a suitable data relocation plan with use of these information. The computer instructs the created data allocation to the switch and storage apparatus and realizes a data allocation satisfying the data relocation plan using the data relocating function.

Figure 1:
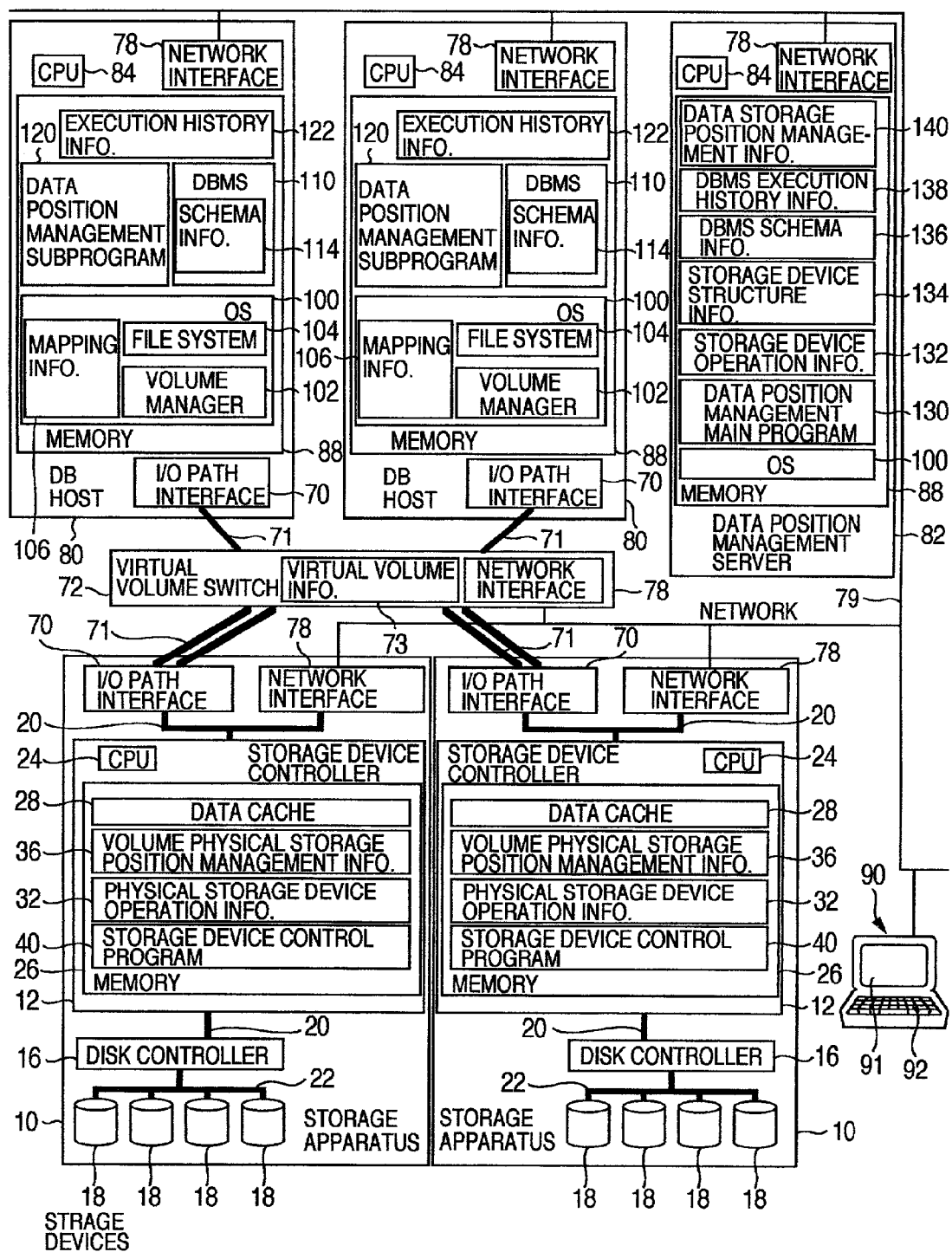
FIG. 1 shows a configuration of a computer system in accordance with an embodiment of the present invention.

FIG. 1 shows a configuration of a computer system in accordance with a first embodiment of the present invention. The computer system of the present embodiment includes DB hosts 80, a data position management server 82, storage apparatuses 10, and an administrator terminal 90. The DB host 80, data position management server 82, storage apparatuses 10 and administrator terminal 90 are connected to a network 79 via respective network interfaces 78 possessed thereby. The administrator terminal 90 has a display screen 91 as an output unit and a keyboard 92 as an input unit. The DB hosts 80 and storage apparatuses 10 are connected from respective I/O path interfaces 70 possessed thereby via respective I/O paths 71 to a virtual volume switch 72 to perform data transfer between the storage apparatuses 10 and DB hosts 80.

The present embodiment is arranged so that the I/O paths 71 for data transfer between the storage apparatuses 10 and DB hosts 80 are provided as different from the network 79. However, such a technique as to transfer data between a computer and a storage system on a network such as iSCSI, is already developed, and this technique may be employed even in the present embodiment. At this time, in the virtual volume switch 72, if it is possible to perform data transfer between the I/O paths 71 and network 79, then the I/O path interfaces 70 may be used also as the respective network interface 78 in the storage apparatuses 10 or DB hosts 80.

The storage apparatus 10 provides a storage area in the form of volume as a storage area management unit, and access or management of a partial area within a volume is executed on a block basis. The storage apparatus 10 includes a network interface 78, an I/O path interface 70, a storage device controller 12, a disk controller 16 and physical storage devices 18. The network interface 78, I/O path interface 70, storage device controller 12 and disk controller 16 are connected respectively by an internal path 20; and the disk controller 16 and storage devices 18 are connected by a physical storage device path 22.

The storage device controller 12 has a CPU 24 and a memory 26. A data cache 28 used as a cache memory in the storage apparatus is allocated onto the memory 26, and a storage device control program 40 is stored thereon as a program for controlling the storage devices. Also provided on the memory 26 are physical storage device operation information 32 and volume physical storage position management information 36 as management information of storage positions on the storage device 18 for physical storage of volumes provided by the storage apparatus 10.

The illustrated storage apparatus 10 has a plurality of storage devices 18 and therefore data belonging to one volume can be distributively positioned in a plurality of storage devices 18. Further, the storage apparatus 10 has a function of dynamically changing the position of data stored on the storage device 18. This data migration instruction can be externally carried out through the network interface 78. However, these are not indispensable but may be applied to the present embodiment even when the storage area of a single physical storage is provided as it is as a volume.

The virtual volume switch 72 has a function of providing to the DB hosts 80 virtual volumes which consist of partial or whole area of volume provided by the storage apparatus 10 or virtual volumes which consist of a combination of two or more thereof. The virtual volume switch 72 has a network interface 78 and holds virtual volume information 73 as information about volumes generated in the virtual volume switch 72.

The virtual volume switch 72, by referring to the virtual volume information 73, converts an access request issued from the host to an access to a suitable storage area of the storage apparatus 10 to realize access operation on virtual volumes. Further, the virtual volume switch 72 also has a function of dynamically changing the volume having the data of the virtual volume stored therein and the storage position in the volume. This data migration instruction may be externally carried out through the network interface 78.

Each of the DB hosts 80 and data position management server 82 has a CPU 84, a network interface 78 and a memory 88. Stored on the memory 88 is an operating system (OS) 100 to be executed.

The DB host 80 has an I/O path interface 70 to execute an access of a volume provided by the virtual volume switch 72. Provided in the OS 100 are a file system 104, a volume manager 102 for creating a logical volume to be used by the host which consists of one or more regions from volumes, and mapping information 106 for management of recorded positions, etc. of data stored in a file or logical raw volume to be provided to an application by the OS 100 under control of the file system 104 or volume manager 102.

The OS 100 may have a raw device as a mechanism for an application to access the virtual volumes recognized by the OS 100 or logical volumes supplied from the volume manager 102 through an interface equivalent to a file. With the illustrated structure, the volume manager 102 is present. In the present embodiment, however, since the arrangement of the logical volume in the volume manager 102 is not changed, the present embodiment may be applied even to a structure where no volume manager 102 is present and a file system directly utilizes a virtual volume provided by the virtual volume switch 72.

Stored on the memory 88 in each of the DB hosts 80 are a DBMS 110, a data position management subprogram 120 for its execution, and execution history information 122. The DBMS 110 has schema information 114 therein. In the illustrated example, the DBMS 110 is arranged to be operated for one host. However, since management is carried out using an identifier for each DBMS 110, the present embodiment may be applied even when a plurality of such DBMS's are operated for a single host, which will be explained later.

On the other hand, stored on the memory 88 of the data position management server 82 are a data position management main program 130 for its execution, storage device operation information 132 as operation information of the storage devices 18 in the storage apparatus 10, storage device structure information 134 as information on the physical structure of each storage apparatus 10 or on volume physical storage position, DBMS schema information 136 as data necessary for data position management among the schema information in the DBMS 110 of the DB host 80, execution history information 138 as information about an execution history of DBMS processing in the DBMS 110, and data storage position management information 140 including the mapping information 106 in the OS 100 in the DB host 80 and information about the virtual volume information 73 in the virtual volume switch 72

In the illustrated example, the data position management server 82 is provided in the form of a computer different from the DB host 80. However, even any DB host 80 is arranged to also play a role of the data position management server 82, the present embodiment may be applied thereto. Further, even when function provided by the data position management server 82 is given onto the virtual volume switch 72 or any storage apparatus 10, the present embodiment may be applied thereto.

FIG. 2 shows physical storage device information 32 held in the storage apparatus 10. The physical storage device operation information 32 contains, as a set, a volume name 501 as the identifier of a volume provided by the storage apparatus 10, a physical storage device name 502 as the identifier of the storage device 18 having data of the volume with the volume name 501, and a cumulative operation time 503 as a cumulative value from a certain time of an operation time for accessing data of the volume of the volume name 501, stored in the storage device 18 of the physical storage device name 502.

The storage device controller 12 in the storage apparatus 10 acquires a start and end time when accessing data to the storage device 18 by using the disk controller 16, judges to which volume the accessed data belong, adds a difference between the start and end times to the cumulative operation time 503 of the data having the corresponding volume name 501 and physical storage device name 502 as an operation time. This information is not necessarily required to be acquired in all the storage apparatuses 10.

FIG. 3 shows volume physical storage position management information 36 held in the storage apparatus 10. The volume physical storage position management information 36 contains volume physical storage position main information 510 for management of mapping of storage positions in the logical address-physical storage device 18, and volume data migration management information 511 as management information about changing operation of the physical storage position of the data belonging to the volume in the storage apparatus 10.

The volume physical storage position main information 510 contains, as a set of data, a volume name 501, a logical block number 512 as a data storage position on the volume of the volume name 501s, a physical storage device name 502 as the identifier of the storage device 18 having the logical block stored therein, and a physical block number 514 as a storage position on the storage device 18. In this case, an entry 515 having 'Empty' in its volume name 501 is a special entry. This entry indicates one of the areas of the storage devices 18 within the storage apparatus 10 to which a volume is not allocated. By copying data to the not-allocated area, the function of dynamically changing of the physical storage position of the data can be realized.

The volume data migration management information 511 contains, as a set, a volume name 501, a migration logical block number 782 indicative of a range of data to be changed in its storage position within the volume, a migration destination physical storage device name 783 and a migration destination physical block number 784 indicative of an identifier of the storage device 18 in which the data is newly stored and of a storage area thereof, a copy pointer 786 indicative of a copy source of the current data, and difference management information 785 for management of re-copy necessity of the data.

Here is a summary of data migration operation with use of the difference management information 785 and copy pointer 786. The difference management information 785 holds '1' indicative of necessity of copying data for each certain amount of area or '0' indicative of unnecessariness of copying data. At the time of starting the data storage position changing operation, all entries of the difference management information 785 are set to '1', and the copy pointer 786 is set to the head of the migration source.

According to the copy pointer 786, data of areas having '1' in their difference management information 785 are sequentially copied to migration destinations to correspondingly update the copy pointer 786. Just before the area managed based on the difference management information 785 is copied, its corresponding entry is set to '0'. When data within the migration area is updated during the data copy, the entry of its corresponding difference management information 785 is set to '1'.

At a stage that all areas have been copied, it is once confirmed that all the entries in the difference management information 785 were set to '0'. When all the entries were set to '0', the volume physical storage position main information 510 is updated to complete the data storage position changing operation. When an entry of '1' still remains, the aforementioned procedure of copying its corresponding area is again repeated. The method of realizing the function of dynamically changing the data storage position may be carried out by another manner. In this case, the volume physical storage position management information 36 will contain not the volume data migration management information 511 but other management information for the function of dynamically changing the data storage position.

Figure 4:
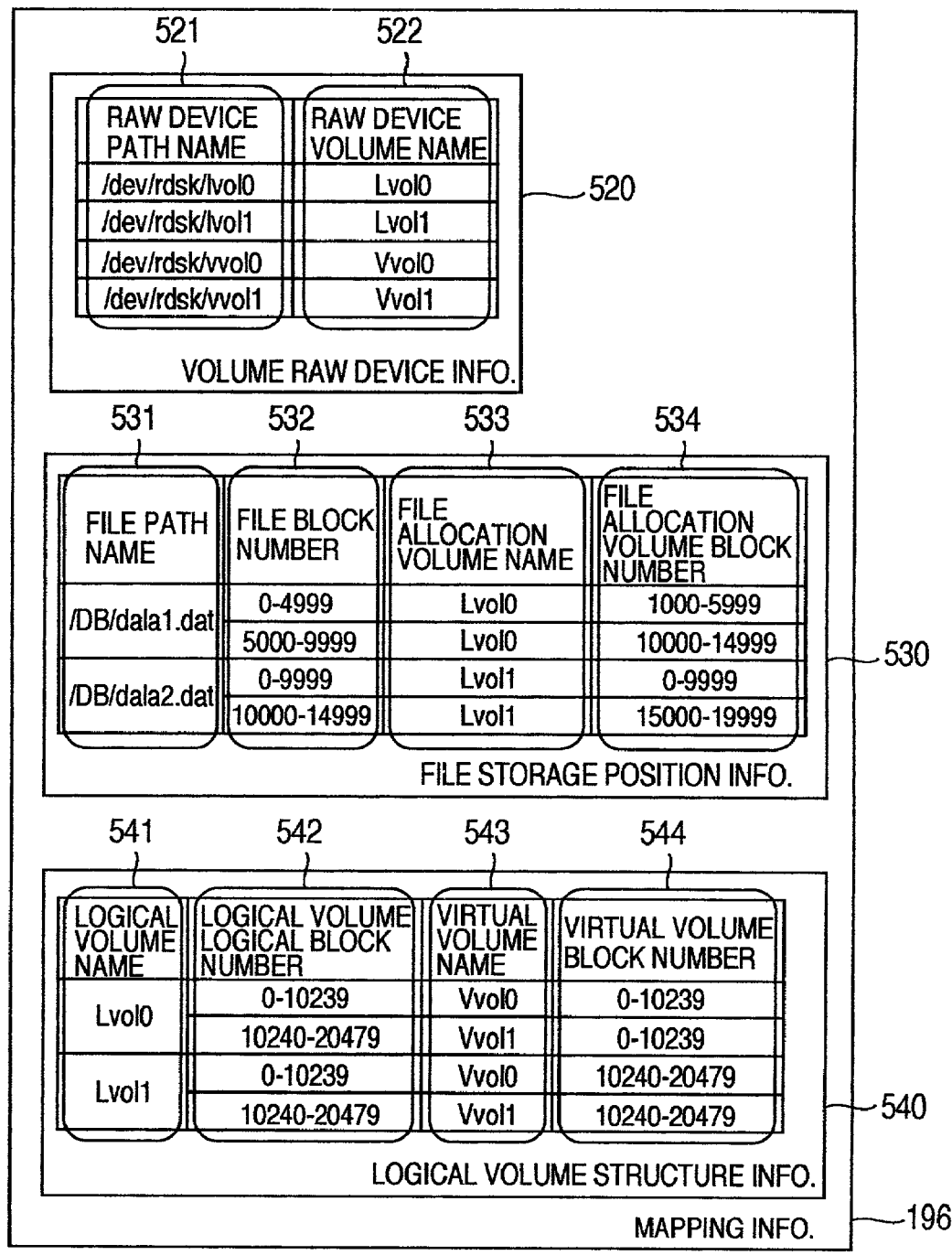
FIG. 4 shows mapping information 106 stored in an OS 100 of a DB host 80 in the first embodiment.

Shown in FIG. 4 is mapping information 106 stored in the OS 100 of the DB host 80. The mapping information 106 contains volume raw device information 520, file storage position information 530 and logical volume structure information 540. The volume raw device information 520 contains, as a set, a raw device path name 521 as an identifier to specify a raw device in the OS 100 and a raw device volume name 522 as an identifier of a virtual or logical volume accessed through the raw device.

The file storage position information 530 contains, as a set, a file path name 531 as an identifier to specify a file in the OS 100, a file block number 532 as a block number for specification of a data position in the file, a file allocation volume name 533 as the identifier of a virtual or logical volume having its corresponding data stored therein, and a file allocation volume block number 534 as a data storage position on the volume.

The logical volume structure information 540 contains, as a set, a logical volume name 541 as the identifier of a logical volume provided by the volume manager 102, a logical volume logical block number 542 indicative of the position of the data on the logical volume, a virtual volume name 543 as the identifier of a virtual volume having its logical block stored therein, and a virtual volume block number 544 as a storage position on the virtual volume.

FIG. 5 shows schema information 114 including data stored in the DBMS 110 to be defined and managed therein and other management information. The schema information 114 contains, as a set, table definition information 551 holding definition information such as table data structures and restriction conditions, index definition information 552 holding definition information such as index data structures and associated tables, log information 553 relating to logs to be used, temporary table area information 554 relating to temporary table areas to be used, data storage position information 555 as management information of storage positions of managed data, cache structure information 556 relating to cache structure, and maximum access parallelism information 557 relating to a parallelism at the time of accessing the data.

The data storage position information 555 contains, as a set, a data structure name 561 as the identifier of a data structure such as table, index, log and temporary table area, a data file path name 562 as the identifier of a file having the data to be stored or of a raw device, and a file block number 563 as a storage position therein.

The cache structure information 556 shows when three types of cache management groups are defined and caches are allocated to the groups. The cache structure information 556 contains, as a set, a group name 565, a cache size 566 as a maximum data size at the time of caching data structure data in the groups on the host, and a belonging data structure name 567 as the identifier of the data structure belonging to the group. The maximum access parallelism information 557 contains, as a set, a data structure name 561 and a maximum access parallelism 569 as information about a maximum parallelism as a general case when accessing the data structure.

FIG. 6 shows execution history information 122 stored on the memory 88 of the DB host 80. Stored in the execution history information 122 is a history of query 570 executed in the DBMS 110. This information is created by the DBMS 110. Or this information may be created by a front end program of the DBMS. In this case, execution history information 122 is stored in a computer having the DBMS front end program present therein.

FIG. 7 shows virtual volume information 73 held by the virtual volume switch 72. The virtual volume information 73 contains virtual volume storage position information 790 and virtual volume data migration management information 791. The virtual volume storage position information 790 contains, as a set, a virtual volume name 543 as the identifier of a virtual volume provided by the virtual volume switch 72 to the DB host 80, a virtual volume block number 544 indicative of the storage position of data on the virtual volume, a storage device name 583 as the identifier of the storage apparatus 10 having the block stored therein, volume name 501 as the identifier of the volume, and a volume logical block number 512 as the storage position on the volume.

An entry 585 having the virtual volume name 543 of 'Empty' is a special entry, and an area on the storage apparatus 10 contained in the entry indicates an area which is not provided to the DB host 80 as a virtual volume. Using such an area as not provided as the virtual volume, the virtual volume switch 72 can perform data migration.

The virtual volume data migration management information 791 contains, as a set, a virtual volume name 543, a migration virtual volume block number 793 indicative of a data range to change the storage position in that volume, a migration destination storage device name 794 indicative of an identifier of the storage apparatus 10 in which the data is to be newly stored and of its storage area, a migration destination volume name 795, a migration destination logical block number 796, a copy pointer 786 indicative of a copy source of the current data, and a difference management information 785 for management of necessity of re-copy of the data.

The function of dynamically changing the data storage position can be implemented by substantially the same manner as explained in the volume data migration management information 511 in FIG. 3. The method of implementing the function of dynamically changing the data storage position may also be realized by another manner. In this case, the virtual volume information 73 will contain not the virtual volume data migration management information 791 but management information for another function of dynamically changing the data storage position.

Shown in FIG. 8 is storage device operation information 132 stored on the data position management server 82. The storage device operation information 132 contains, as a set, a storage device name 583 as the identifier of the storage apparatus 10, a volume name 501 as the identifier of a volume provided by the storage apparatus 10, a physical storage device name 502 as the identifier of the storage device 18 present in the storage apparatus 10, an old cumulative operation time 593 as the value of the cumulative operation time 503 at the time of calculating the operation rate 594 in the previous time, and an operation rate 594 indicative of a rate of operation time in a certain constant time; and also contains a previous cumulative operation time acquisition time 595 as a time at which the previous cumulative operation time was acquired for calculating operation rate 594.

The storage apparatus 10 has a mechanism of externally providing the physical storage device operation information 32. Utilizing the mechanism, the data position management main program 130 acquires the physical storage device operation information 32 gathered by the storage apparatus 10 and stored therein at intervals of a constant time through the network 79, and calculates an operation rate 594 between the previous cumulative operation time acquisition time 595 and the current data acquisition time with use of the acquired cumulative operation time 503, old cumulative operation time 593, previous cumulative operation time acquisition time 595 and current data acquisition time, and stores therein. Thereafter the storage apparatus 10 stores the acquired cumulative operation time 503 in the old cumulative operation time 593, and stores the current data acquisition time in the previous cumulative operation time acquisition time 595.

It is not necessary for all the storage apparatuses 10 to hold the physical storage device operation information 32 therein. In such a case, the entry of the storage device operation information 132 is included only for the storage apparatus 10 holding the physical storage device operation information 32. Further, when the physical storage device operation information 32 is not held in any of all the storage apparatuses 10, the necessity of holding the physical storage device operation information 132 can be eliminated.

FIG. 9 shows storage device structure information 134 stored on the data position management server 82. The storage device structure information 134 contains, as a set, a storage device name 583 as the identifier of the storage apparatus 10, migration function information 601 indicative of whether or not the storage apparatus 10 has the function of dynamically changing the data storage position, a data cache capacity 602 indicative of a data cache capacity held by the storage apparatus 10, and storage device volume physical storage position management information 603 holding the volume physical storage position main information 510 in the storage apparatus 10 having the storage device name 583.

The storage apparatus 10 has a function of externally providing information relating to the volume physical strage position main information 510 and the size of the data cache 28, and thus in order to create the storage device structure information 134, the data position management main program 130 acquires the volume physical storage position management information 36 and the information about the size of the data cache 28 from the storage apparatus 10 via the network 79. The storage apparatus 10 is not necessarily required to have the function of externally providing the data about the size of the data cache 28, in which case a corresponding part of the data cache capacity 602 is stored as no or invalid data.

With regard to the volume physical storage position main information 510, when the volume provided by the storage apparatus 10 is stored on the storage device 18 without altering the position and its mapping is previously appreciated by the data position management main program 130, such as when only one storage device 18 is provided as one volume as it is, the storage apparatus 10 is not required to have a function of externally providing the information. At this time, the data position management main program 130 sets the contents of the storage device volume physical storage position management information 603 according to this rule. This rule is provided to the data position management main program 130 by an administrator with use of a configuration file or the like.

Figure 10:
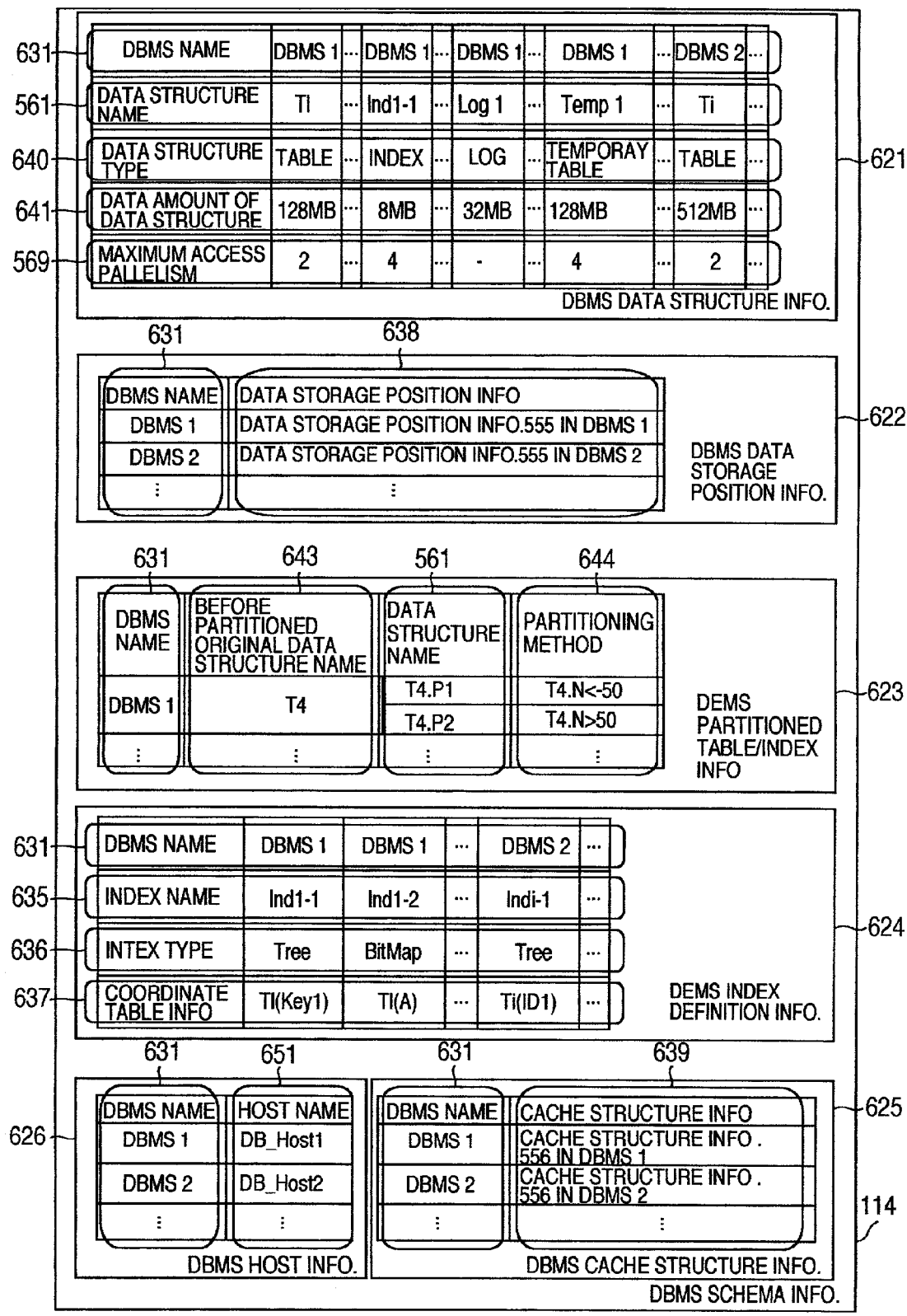
FIG. 10 shows DBMS schema information 136 stored on the data position management server 82.

FIG. 10 shows DBMS schema information 136 stored on the data position management server 82. The DBMS schema information 136 includes DBMS data structure information 621, DBMS data storage position information 622, DBMS partitioned table/index information 623, DBMS index definition information 624, DBMS cache structure information 625, and DBMS host information 626.

The DBMS data structure information 621, which relates to a data structure defined in the DBMS 110, contains, as a set, a DBMS name 631, a data structure name 561 as the identifier of a data structure such as table, index, log, and temporary table areas in the DBMS 110, a data structure type 640 indicative of the type of the data structure, a data structure data amount 641 indicative of a total amount of data used by the structure and being calculated from the data storage position information, and a maximum access parallelism 569 as information relating to a maximum parallelism at the time of accessing the data structure. At this time, the DBMS data structure information 621 may not have the value of the maximum access parallelism 569 depending on the data structure.

The DBMS data storage position information 622 contains, as a set, a DBMS name 631 and data storage position management information 638 as the data storage position information 555 in the DBMS. The DBMS partitioned table/index information 623, which is data structure management information corresponding to several groups of one table or index divided according to a certain attribute value, contains, as a set, a DBMS name 631 as the identifier of the DBMS 110 to which the partitioned data structure belongs, a partition source data structure name 643 as the identifier of the data structure before divided, a data structure name 561 as the identifier of the data structure after divided, and a partitioning method 644 holding the partitioning conditions. The partitioned data structure will be hereinafter referred to merely as the data structure and refer to the data structure after partitioned, unless otherwise stated.

The DBMS index definition information 624 contains, as a set, a DBMS name 631, an index name 635 as the identifier of an index, an index type 636 indicative of the type of the index, and correspondence table information 637 indicative of with which table and which attribute the index is associated. The DBMS cache structure information 625, which relates to the cache of the DBMS 110, contains, as a set, a DBMS name 631 and cache structure information 556 in the DBMS 110. The DBMS host information 626, which is used to manage one of the hosts on which the DBMS 110 having the DBMS name 631 is being executed, contains, as a set, a DBMS name 631 and a host name 651 as the identifier of the DBMS execution host.

With regard to information other than the DBMS host information 626 in the DBMS schema information 136, the data position management main program 130 creates it by acquiring necessary information from the schema information 114 managed by the DBMS 110. The schema information 114 of the DBMS 100 is acquired by the data position management main program 130 which directly acquires the information via the network 79 or by the data position management subprogram 120 which acquires information disclosed as a view using a query language such as SQL or by utilizing a mechanism used only for disclosing internal management data. The DBMS host information 626 is system structure information which is set by the administrator.

Figure 11:
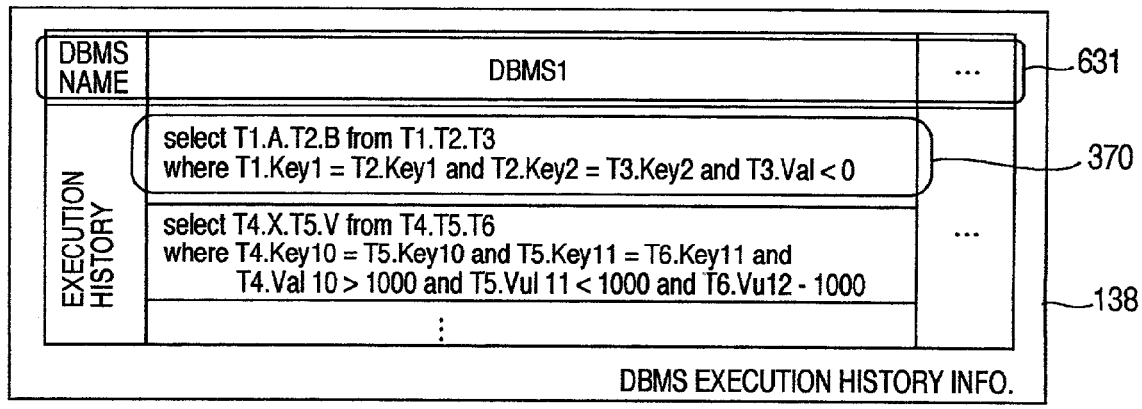
FIG. 11 shows execution history information 138 stored on the data position management server 82.

Shown in FIG. 11 is execution history information 138 stored on the data position management server 82. The execution history information 138 contains a DBMS name 631 as the identifier of the DBMS 110 and a history of queries 570 executed by the respective DBMS's 110. This corresponds to collection and storage of the execution history information 122 stored in the DB host 80 via the network 79 with use of the data position management subprogram 120.

As mentioned above, there is also possibility that the execution history information 122 is stored on a computer by which the DBMS front end program is executed. In this case, a means for transferring the execution history information 122 from the computer by which the front end program is executed to the data position management server 82 is provided so that the data position management main program 130 stores the execution history information 122 as the execution history information 138. In the present embodiment, the necessity of collecting the execution history information 122 from any the DBMS's 110 can be eliminated, and the necessity of provision of the execution history information 138 can also be removed.

Figure 12:
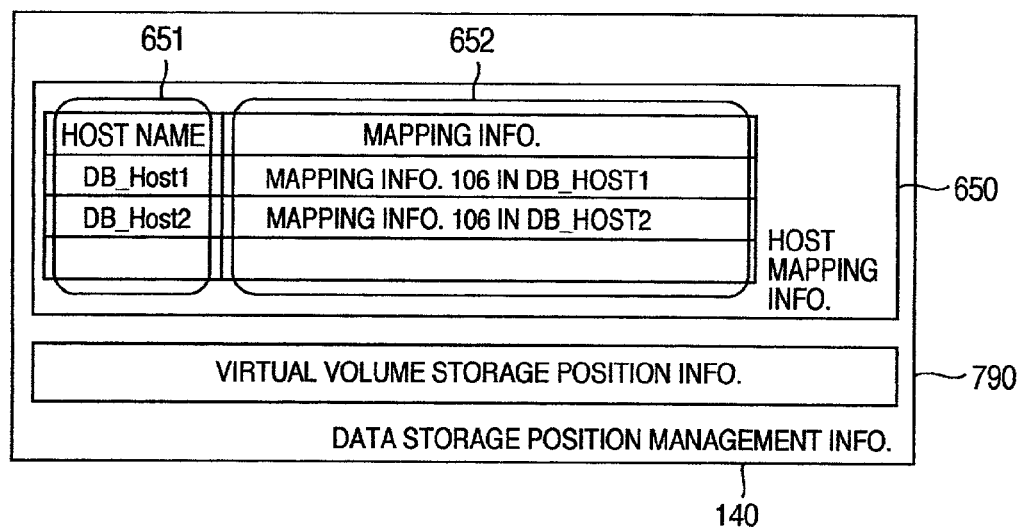
FIG. 12 shows data storage position management information 140 stored on the data position management server 82.

FIG. 12 shows data storage position management information 140 stored on the data position management server 82. The data storage position management information 140 contains host mapping information 650 and virtual volume storage position management information 790. The host mapping information 650 possesses, as a set, a host name 651 as a host identifier and mapping information 106 in the host. This corresponds to collection and storage of the mapping information 106 held by the OS 100 of the DB host 80 using the data position management subprogram 120 under control of the data position management main program 130 via the network 79.

The data position management subprogram 120 acquires the mapping information 106 by means of a management command provided by the OS 100, information providing mechanism, direct analysis of referrable management data, and so on. The virtual volume switch 72 has a mechanism of externally providing the virtual volume storage position information 790, and the data position management main program 130 acquires the virtual volume storage position information 790 from the virtual volume switch 72 via the network 79.

Figure 13:
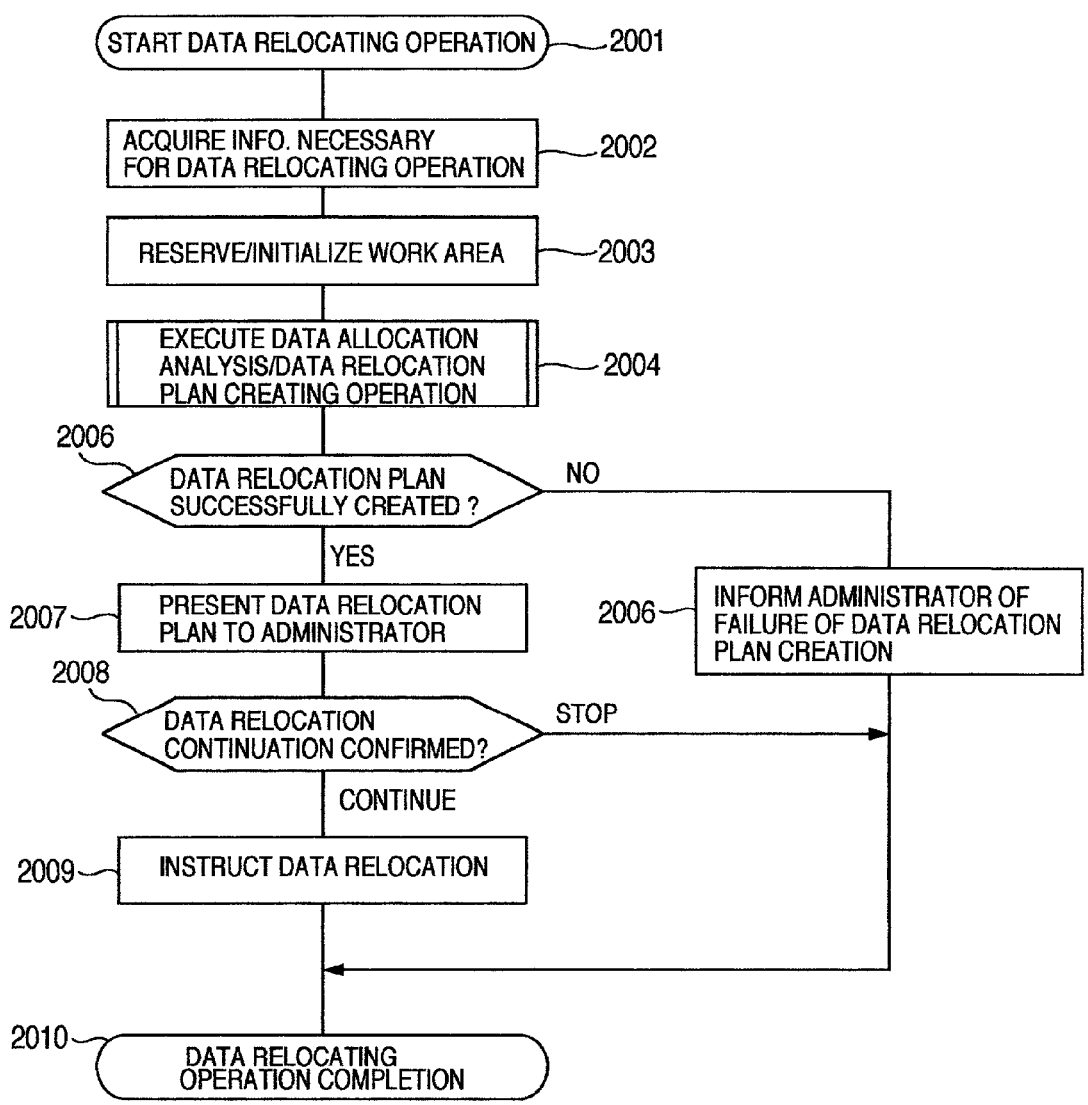
FIG. 13 shows processing flowchart of data relocating operations in a data position management main program 130.

FIG. 13 shows a processing flowchart of data relocating operations under control of the data position management main program 130. It is assumed in the illustrated example that processing start is done by an administrator's instruction. As will be explained later, a plurality of different types of data allocation analysis/data relocation plan preparing operations can be executed and the processing is started by specifying the type of the operation to be processed. It is also assumed that, when a parameter is required for the processing, the necessary parameter is instructed by the administrator. In the present embodiment, the function of dynamically changing the data storage position is possessed by the virtual volume switch 72 and storage apparatus 10. However, the storage apparatus 10 is not necessarily required to the function of dynamically changing the data storage position.

In a step 2001, data relocating operation is started. At this time, the administrator specifies what to be executed as the data allocation analysis/data relocation plan preparing operation. Further, if necessary, the administrator specifies a parameter.

In a step 2002, the program collects information necessary for the data relocating operation, and stores the collected information as the storage device operation information 132, storage device structure information 134, DBMS schema information 136, execution history information 138 and data storage position management information 140. The data collection can be previously executed regardless of the processing start of the step 2001. In this case, it is confirmed in this step that there is no change in the information from its acquired time to the current time.

In a step 2003, a work area is reserved and initialized. As the work area, the data relocation work information 670 shown in FIG. 15 and created migration plan information 750 shown in FIG. 16 are utilized. Details of the data relocation work information 670 and migration plan information 750 as well as how to create its initializing data will be explained later.

In a step 2004, data allocation analysis/relocation plan preparing operation is executed. As will be explained later, there are different data allocation analysis/relocation plan preparing operations from several viewpoints. In this step, the operation specified in the step 2001 is executed. When the program accepts a parameter in the step 2001, it provides operation necessary to execute the parameter.

In a step 2005, the program confirms whether or not the data relocation plan creating operation of the step 2004 was successful. If successful, then the program proceeds to a step 2007. If failed, then the program proceeds to a step 2006 to inform the administrator of a failure of the data relocation plan preparing operation, and then proceeds to a step 2010 to complete the operation.

In the step 2007, the program presents the data relocation plan prepared in the step 2004 to the administrator. The administrator, when looking at the presentation, judges to continue the data relocating operation or not.

In a step 2008, the program receives an instruction from the administrator about whether or not to continue the data relocating operation. In the case of continuation, the program goes to a step 2009. Otherwise, the program goes to the step 2010 to complete the operation.

In the step 2009, the program, on the basis of the data relocation plan prepared in the step 2004, issues a data relocation instruction to the virtual volume switch 72 or storage apparatus 10. The virtual volume switch 72 and storage apparatus 10 have each a function of receiving the data relocation instruction via the network 79, by utilizing which the program issues the instruction.

In the instruction format, the program issues an instruction to the virtual volume switch 72 to specify a target data area of the virtual volume provided by virtual volume switch 72 and to move to the destination data area of the volume in the storage apparatus 10; whereas, the program issues an instruction to the storage apparatus 10 to specify a target data area of the volume provided by the storage apparatus 10 and to move to the destination data area of the storage device 18 in the storage apparatus 10. According to this instruction, the virtual volume switch 72 or storage apparatus 10 executes the data relocating operation.

In the step 2010, the program completes the data relocating operation.

Figure 14:
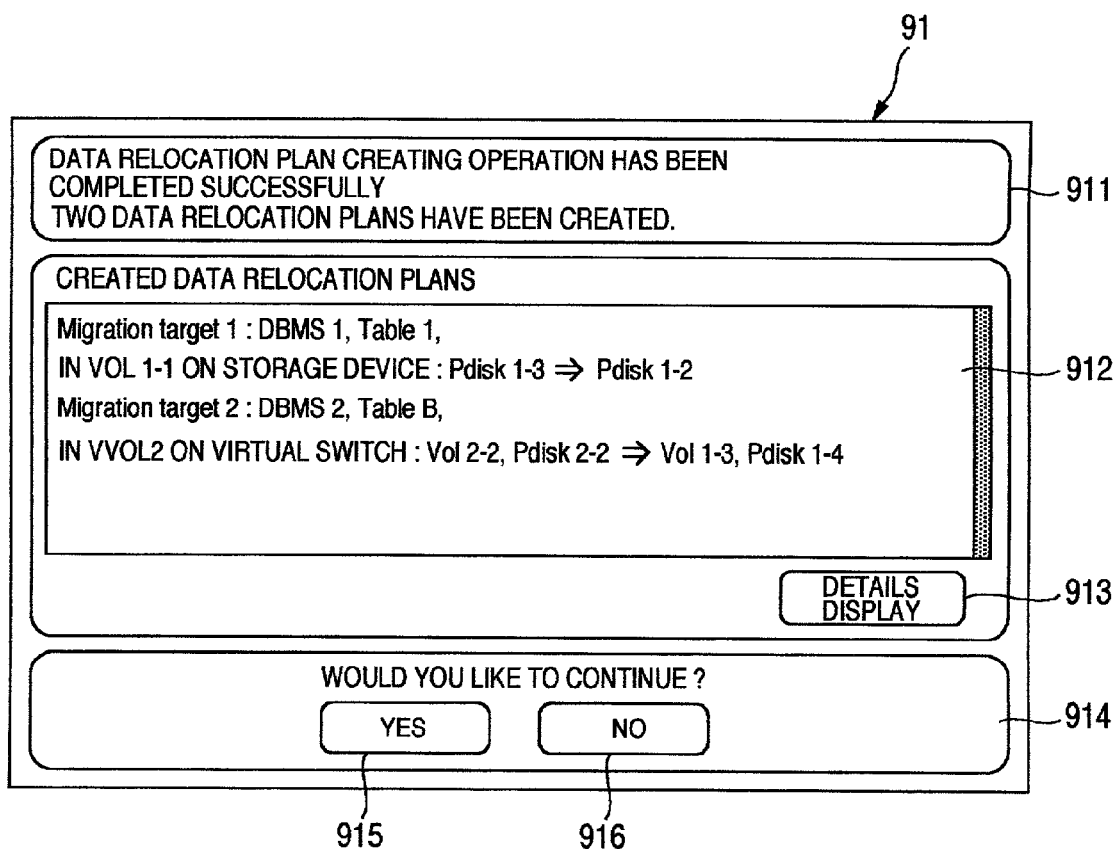
FIG. 14 is an example of a data relocation plan displayed on a display screen of an administrator terminal.

The operations of the steps 2005, 2007 and 2008 in FIG. 13 are shown as in FIG. 14 on the display screen 91 of the administrator terminal 90. In FIG. 14, on a display screen area 911, the program informs the administrator that the preparation of the data relocation plan was successful as an execution result of the step 2005 in FIG. 13 and of the number of such data relocation plans. A display screen area 912 presents the created data relocation plans as a result of the operation of the step 2007 in FIG. 13 to the administrator. When the data relocation proposals cannot be wholly displayed within the display screen area 912, the administrator can look at the entire data relocation plans by moving a scroll bar provided at a right side of the area 912 with use of the keyboard 92 or mouse (not shown). When the administrator clicks a button 913 with use of the keyboard 92 or mouse, this causes a more detailed data relocation plan to appear. In a display screen area 914, the administrator can check whether or not to continue the data relocating operation as the operation of the step 2008 in FIG. 13. When the administrator wants to continue the data relocating operation, he/she clicks a button 915 marked with 'YES' to execute the operation of the step 2009 in FIG. 13. When the administrator does not want to continue the data relocating operation, he/she clicks a button 916 marked with 'NO' in the display screen area 914.

In this conjunction, a similar display to in FIG. 14 appears even in another relocation plan to be explained later.

In the processing flowchart, the processing is started with an administrator's instruction and the administrator judges whether or not there is a problem in the created data relocation plan in the steps 2007 and 2008. When the confirmation by the administrator can be omitted, automation of the data relocating operation can also be possible by starting its operation at a process starting time set by a timer.

FIG. 15 shows data relocation work information 670 created in the step 2003 in FIG. 13. The data relocation work information 670 contains virtual volume physical storage position information 680 and data structure virtual-volume position information 690.

The virtual volume physical storage position information 680 is information about the data of a virtual volume provided by the virtual volume switch 72 is stored in which position of which storage device 18 in which storage apparatus 10. The information 680 contains, as a set, a virtual volume name 543, a virtual volume block number 544, a storage device name 583, a volume name 501, a physical storage device name 502 and a physical block number 514. In the virtual volume physical storage position information 680, initial data are created by referring to the virtual volume storage position management information in the data storage position management information 140, the storage device name 583 in the storage device structure information 134, and the storage device volume physical storage position management information 603, and combining corresponding parts of the volume provided by the storage apparatus 10.

A group of entries 681 having the virtual volume name 543 of 'Empty' indicate a set of ones of the storage areas of the storage device 18 in the storage apparatus 10 where data can be migrated for data relocation. At the time of creating a data relocation plan, the program finds a suitable data migration destination from these areas. One of these entries having the volume name 501 of effective value can be used for dynamic change of the data storage position in the virtual volume switch 72, which use is not subjected to any restriction. One of the entries having the volume name 501 of no (inavailable) value can be used for dynamic change of the data storage position in the storage apparatus 10 and can be used only for the storage position change of data stored in the storage apparatus 10 to which the area belongs.

The data structure virtual-volume position information 690 indicates the place where the data structure held by the DBMS 110 is stored in the virtual volume provided by the virtual volume switch 72s. The information 690 contains, as a set, a DBMS name 631, a data structure name 561, a data file path name 562, a file block number 563, a virtual volume name 543 and a virtual volume block number 544. In this information, its initial data are created by referring to the DBMS data storage position information 622 and DBMS host information 626 in the DBMS schema information 136 and the host mapping information 650 in the data storage position management information 140, and combining corresponding parts of the file (raw device) path and logical (virtual) volume.

Shown in FIG. 16 is migration plan information 750 which stores a data migration plan created by the data allocation analysis/data relocation plan preparing operation executed in the step 2004 in FIG. 13. The migration plan information 750 contains virtual volume migration plan information 751 for record of a data migration instruction to the virtual volume switch 72 and physical storage position migration plan information 752 for record of a data migration instruction to the storage apparatus 10. These information are initialized so as not to have any data.

The virtual volume migration plan information 751 contains, as a set, a migration sequence 761 indicative of an execution sequence of migration instructions, a migration virtual volume name 762 indicative of its data area, a migration virtual volume block number 763, a migration destination storage device name 764 indicative of a storage device as its data migration destination, a volume and a storage area in the volume, a migration destination volume name 765, and a migration destination volume logical block number 766.

The physical storage position migration plan information 752 contains, as a set, a migration sequence 761 indicative of an execution sequence of migration instructions, a migration storage device name 767, a migration volume name 768 and a migration volume logical block number 769 indicative of the storage apparatus 10 having migration data, the volume and data area thereof, a migration destination physical storage device name 771 and a migration destination physical block number 772 indicative of the physical storage device as its data migration destination and storage area thereof. With respect to the physical storage position migration plan information 752, when any storage apparatus 10 has no function of dynamically changing the physical storage position in the storage device, it is unnecessary to hold this information.

Explanation will then be made as to the data allocation analysis/data relocation plan preparing operation executed in the step 2004. As mentioned above, there exist several types of such operations. A common thing to these operations is to prepare a data migration plan for sequential data relocation. To this end, the sequence of data migration is meaningful. The sequence is held in the migration sequence 761 in the migration plan information 750 so that data relocation is carried out by performing the data migration according to the sequence. Further, for the sequential operation, it is necessary to determine a method for migrating the next data on the basis of the data allocation after the migration. To this end, each time the data migration plan is prepared, the data relocation work information 670 must be updated to an arrangement after the data migration.

The preparation of a data migration plan at the time of creating a data relocation plan is carried out as follows. Continuous migratable areas more than a desired data amount to be migrated are extracted from the data relocation work information 670, the extracted areas are suitably selected and confirmed about whether or not to satisfy set conditions or restrictions to be explained later. When the conditions or restrictions are satisfied, these areas are set as a migration destination. When not satisfied, other areas are selected to again check about whether or not to satisfy the conditions or restrictions. The above operation is repeated until areas satisfying the set conditions and restrictions are detected or until it is confirmed that continuous migratable areas exceeding all the migratable data amount fail to satisfy the set conditions and restrictions. If all the areas fail to satisfy the set conditions and restrictions, then the system terminates its operation as a failure in preparing the data migration plan.

At this time, important is that an improper data allocation should be avoided after the migration. In the RDBMS, in particular, there is a high possibility that accesses to specific data are simultaneously carried out. To avoid this, it is necessary to arrange the specific data onto different storage devices 18.

To this end, when a data migration plan is created on all cases described later, the system examines the data structure included in the data to be migrated and the data structure included in the migration destination, and confirms whether or not a log and other data, a temporary table area and other data, and table data and tree-structured index data created correspondingly are arranged on the same storage device 18 after migration. When these data are arranged on the same storage device, the system judges that the relocation plan cannot be acceptable.

The regions of any one of physical storage devices 18 in which certain data structures are stored and inversely data structures to which the data stored in the regions of any one of physical storage devices 18 correspond can be grasped by combining the virtual volume physical storage position information 680 and data structure virtual-volume position information 690 in the data relocation work information 670 with corresponding parts of the virtual volume.

Figure 17:
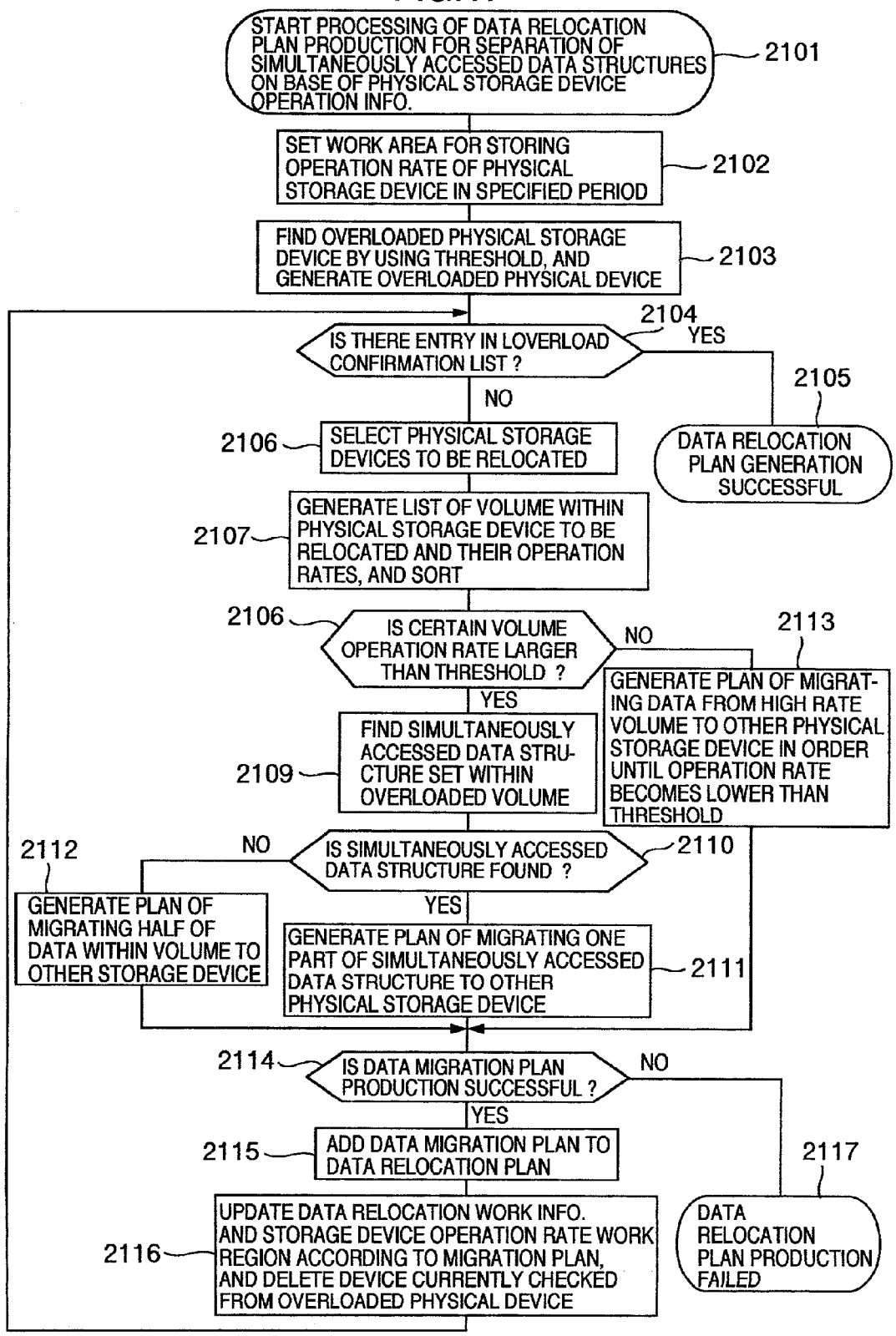
FIG. 17 shows a processing flowchart of data relocation plan creating operation to separate simultaneous access execution structures based on the storage device operation information 132.

FIG. 17 shows a processing flowchart of data relocation plan creating operations to separate simultaneously accessed data structures on the basis of the storage device operation information 132 as a first data allocation analysis/relocation plan preparing operation. In the present operation, when the operation rate of the storage device 18 exceeds its threshold value, the system determines that the storage device is in its disk bottleneck state and prepares a data migration plan to solve it.

As mentioned above, the storage device operation information 132 does not necessarily contain operation information relating to the storage devices 18 in all the storage apparatuses 10. With respect to the storage device 18 where the operation information is not present, the system regards it not as one to be treated in preparation of a data relocation plan in this process, and operates under an assumption that such a storage device does not exist. In this process, the system grasps a problem point on the basis of actually measured values and finds a method of solving the problem. Therefore, the system can prepare a more accurate data relocation plan, and can effectively work even when incorporating an automatic data migration function as a means for automatically removing the disk bottlenecks.

The process starts with a step 2101. The administrator assigns the period in which the operation rate is to be referred to by the system.

In a step 2102, the system acquires a work area for record of a set of the identifier of the storage device 18 and the operation rate of the storage device 18 in the specified duration, refers to the storage device operation information 132, sets the information, and sorts it in a descending order of operation rate of the storage devices 18. In the storage device operation information 132, when data are stored in the same storage device 18 but belong to different volumes, the system acquires the operation rates of the data separately. Accordingly, it is necessary to obtain the operation rate of the storage device 18 as a sum of these operation rates. In a step 2103, the system creates an over-load check list of storage devices 18 having operation rates exceeding their threshold values on the basis of a sorted result of the step 2102. Even with regard to entries in this list, the sequence of the entries are kept in a descending order of the operation rates.

In a step 2104, the system checks the existence of an entry in the over-load check list. If there is no entry, the system regards the storage device 18 in the over-loaded state as not present, and proceeds to a step 2105 to terminate its operation as a successful end of the data relocation plan creating operation. When at least an entry exists, the system proceeds to a step 2106.

In the step 2106, the system selects one of the storage devices 18 having the highest operation rate in the over-load check list as the storage device 18 to be relocated. In a step 2107, the system creates lists of volumes and operation rates in the storage device 18 as an object to be relocated by referring to the storage device operation information 132, and sorts the lists in a descending order of operation rates.

In a step 2108, the system confirms whether or not the operation rates of the volumes in the list exceed a predetermined threshold value. When the operation rates of all the volumes fail to exceed the threshold value, the system goes to a step 2113. Otherwise, the system goes to a step 2109.

In the step 2109, with regard to the volume having the operation rate exceeding the threshold value, the system detects whether or not a set of data which data are possibly accessed simultaneously in the storage device 18, i.e., a log and other data, a temporary table area and other data, table data and a tree-structured index data prepared correspondingly, as the confirmation object, are stored in the same volume. In a step 2110, the system confirms the result of the step 2109. When a set of simultaneous access data structures exists, the system goes to a step 2111. Otherwise, the system goes to a step 2112.

In the step 2111, the system prepares a data migration plan to store data belonging to the set of simultaneous access data structures in different storage devices 18, and then proceeds to a step 2114.

In a step 2112, the system divides data in the volume being now checked into two according to the logical block number, creates a data migration plan to move one divided data to another storage device 18, and goes to a step 2114.

In a step 2113, until the operation rate of the storage device 18 being now checked becomes smaller than its threshold value, the system creates a data migration plan to the entire data of the volume stored in that storage device 18 to another storage device 18 in a descending order of operation rates of the volumes, and then proceeds to the step 2114.

At the time of detecting a data migration destination in the steps 2111, 2112 and 2113, the system predicts the operation rate of the storage device as a migration destination after the migration. The system considers that the data migration causes the operation rate of the storage device 18 as the migration destination to increase by the revised operation rate of the volume on the storage device 18 including the migrated data when a difference in performance between the storage devices 18 is known; whereas the system considers that the data migration causes the operation rate of the storage device 18 to increase by the unmodified operation rate of the volume on the storage device 18 including the migrated data when the performance difference is unknown; and the system creates a data migration plan to migrate the data to such a place that the value after the addition does not exceed its threshold value. With regard to the addition amount of the operation rate, a ratio between migration data amounts may be considered. However, the system assumes that only the data to be migrated are concentrically accessed to, considering the bias in access to data.

In the step 2114, the system confirms whether or not the data migration plan was successful. In the case of a failure, the system goes to a step 2117 to terminate its operation as a failure in the data relocation plan creating operation. In the case of a success, the system goes to a step 2115.

In the step 2115, the system adds the created data migration plan to the migration plan information 750 and goes to a step 2116. In the step 2116, the system modifies the data relocation work information 670 according to the created data migration plan, and modifies the values of the operation information created in the step 2102 of the migration destination storage device 18 to an operation rate judgement value after the above migration, that is, the operation rate of the destination physical storage device in the operation information is increased by above-described value. Thereafter the system deletes the storage device 18 being currently checked from the over-load check list and returns to the step 2104 for the next confirmation.

Next shown as a second data allocation analysis/data relocation plan creating process is a data relocation plan creating process to separate simultaneous access execution data structures based on the execution history information 138. In this process, the system acquires a set of data accessed simultaneously from the query execution history, and creates a data relocation plan to arrange these data at the different storage devices 18. As mentioned above, the system cannot acquire the execution history for all the DBMS 110. Data used by the DBMS 110 having no execution history therein during this process execution will not be subjected to the data relocation.

In the present process, the query execution simultaneous access data count information 700 shown in FIG. 18 is utilized. The query execution simultaneous access data count information 700 contains, as a set, a DBMS name 631, a data structure name A 701 and a data structure name B 702 indicative of sets of data structure names 561 of data structures which may be possibly simultaneously accessed, and a count value 703 as a frequency at which the data structure set was judged to have been accessed through the analysis of the DBMS execution history information 138. These data sets are sorted by the value of the count value 703.

The system creates the query execution simultaneous access data count information 700 from the DBMS execution history information 138. First, the system erases all the entries in the query execution simultaneous access data count information 700. When formulaic processings are carried out in the DBMS 100, the system first performs grouping operation according to its type and confirms the frequency how many times the type of processing was executed.

Subsequently, the system acquires a query execution plan for each type of processing from the DBMS 100. The system judges a set of data structures to be simultaneously accessed on the basis of a processing procedure shown by the query execution plan. And the system refers to the DBMS name 631, data structure name A 701 and data structure name B 702 in the query execution simultaneous access data count information 700, and when a corresponding set of data structures is already present, the system adds the earlier-found processing frequency of the type to the count value 703. When a corresponding set of data structures is not present yet, the system adds a new entry and sets the count value 703 to the earlier-found processing frequency of the type.

When non-formulaic processing is carried out in the DBMS 100, the system acquires a query execution plan for each executed query, and judges a set of data structures to be simultaneously accessed on the basis of the processing procedure shown by the query execution plan. And the system refers to the DBMS name 631, data structure name A 701 and data structure name B 702 in the query execution simultaneous access data count information 700, and when a corresponding set of data structures already exists, the system adds '1' to the count value 703. When a corresponding set of data structures does not exist yet, the system adds a new entry and sets '1' to the count value 703.

The judgement of data structures to be possibly simultaneously accessed based on the query execution plan is carried out as follows. First when an access is conducted to a tree-structured index, the system judges that its tree-structured index data and table data to be indexed are simultaneously accessed. When data update or insert operation is carried out, the system judges that a log and other data are simultaneously accessed. The subsequent operation depends on the characteristics of the DBMS 110. For example, there exists such an RDBMS that, at the time of creating a query execution plan, a plan is created to execute nested-loop join operations over a multiplicity of stages and to simultaneously execute operations over the stages. When this RDBMS is used, the system can judge that table data to be used in the nested-loop join operations over the multiple stages and tree-structured index data to the table are simultaneously accessed.

In this way, the judgement of simultaneous access data on the basis of the query execution plan requires the processing characteristics of the DBMS 110 to be grasped. However, it is assumed in the illustrated example that the types of the DBMS 110 to be used are narrowed and the data position management main program 130 has a function of being able to grasp a set of simultaneous access data structures inherent in the DBMS 110.

Shown in FIG. 19 is a processing flowchart of operations of the data relocation plan creating process to separate simultaneous access execution data structures on the basis of the DBMS execution history information 138. The process starts with a step 2201. In a step 2202, the system creates such query execution simultaneous access data count information 700 as mentioned above as information relating to a set of data structures simultaneously accessed from the execution history and to its execution frequency. In a step 2203, the system finds data structures having the value of the count value 703 not smaller than a certain proportion to the total value of count values 703 over all entries and DBMS's 110 belonging thereto, and stores them as a check list.

In a step 2204, the system creates a data relocation plan to store sets of data structures included in the check list found in the step 2203 in different storage devices 18, and proceeds to a step 2205. The operation of the step 2204 will be explained later by referring to FIG. 20. In the step 2205, the system confirms whether or not the data relocation plan was successfully prepared in the step 2204. In the case of the successful plan preparation, the system goes to a step 2206 to terminate its operation as a success in the data relocation plan creating operation. In the case of the unsuccessful plan preparation, the system goes to a step 2207 to terminate its operation as a failure in the data relocation plan creating operation.

Figure 20:
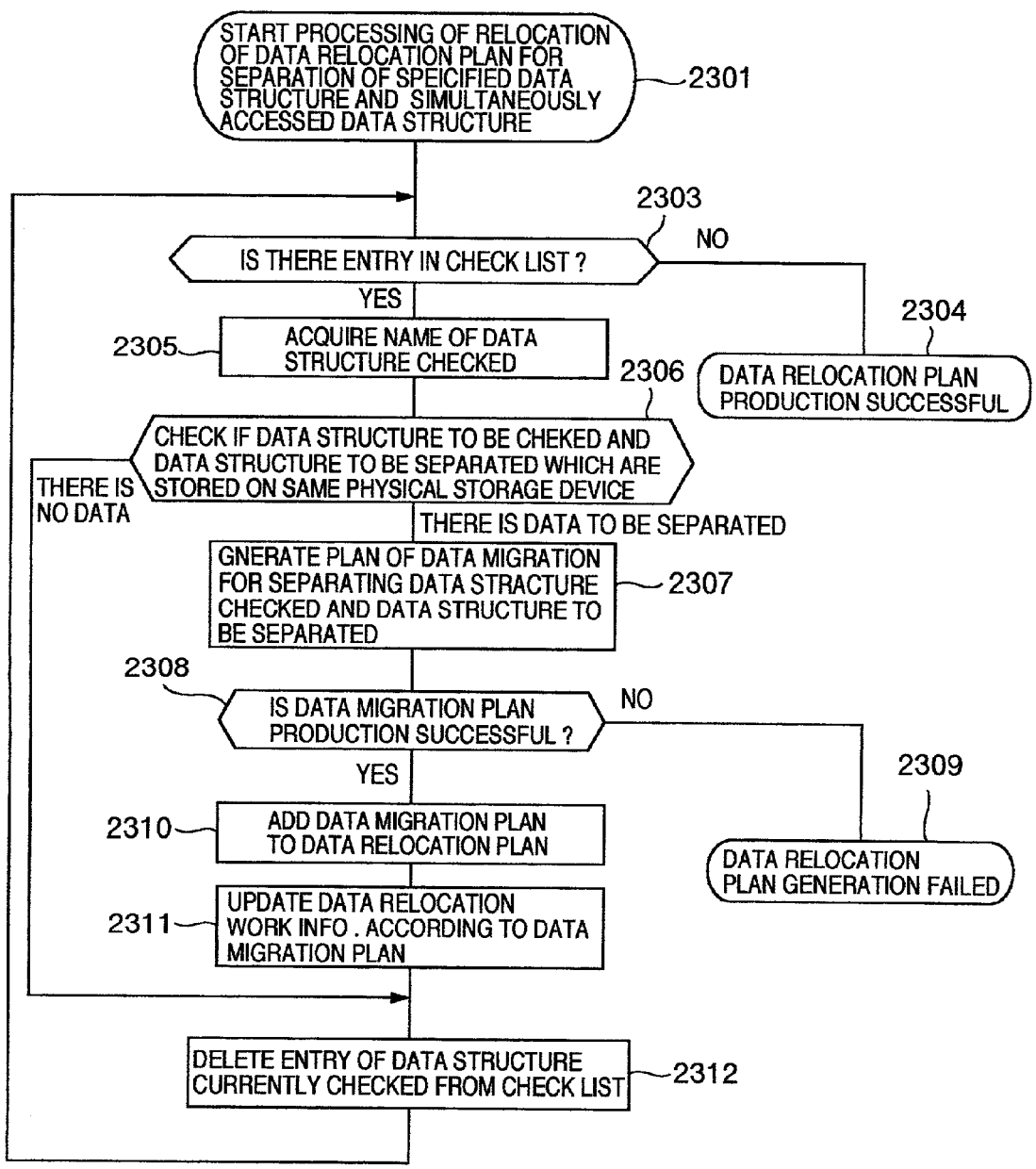
FIG. 20 is a processing flowchart of operations of creating a data relocation plan to separate a set of a specified data structure and a data structure to be simultaneously accessed with a high probability.

FIG. 20 shows a processing flowchart of preparing a data relocation plan to separate a specified data structure from a set of data structures to be highly possibly accessed simultaneously with the specified data structure. When the process starts, the system gives a check list which includes a pair of data structure names whose data should be separated from the same storage device 18.

The process starts with a step 2301. In a step 2303, the system confirms whether an entry exists in the check list. If there is no entry, the system proceeds to a step 2304 to terminate its operation as a success in the data relocation plan creating operation. Otherwise, the system proceeds to a step 2305.

In the step 2305, the system acquires from the check list a set of one data structure name to be checked and a set of DBMS name belonging thereto as well as a set of its separation data structure names and a DBMS name belonging thereto, and goes to a step 2306.

In the step 2306, the system check whether or not the data structure to be checked and the data structure to be separated therefrom are stored in an identical physical storage device. As mentioned above, this confirmation can be realized by referring to the data relocation work information 670. When the both data structures are present all on different physical storage devices, the system goes to a step 2312. When the both data structures are present on a physical storage device, the system goes to a step 2307.

In the step 2307, the both data structures are present on the same physical storage device 18, the system creates a data migration plan to separate the data structures present in a same physical storage device 18. In a step 2308, the system confirms whether or not the data migration plan was successfully created. In the case of a successful creation, the system goes to a step 2310. In the case of a failure, the system goes to a step 2309 to terminate its operation as a failure in the data relocation plan creating operation.

In the step 2310, the system stores the created data migration plan in the migration plan information 750. In a step 2311, the system updates the data relocation work information 670 according to the created data migration plan and goes to a step 2312.

In the step 2312, the system deletes an entry corresponding to the set of data structures to be now confirmed from the check list and goes to a step 2303.

Figure 21:
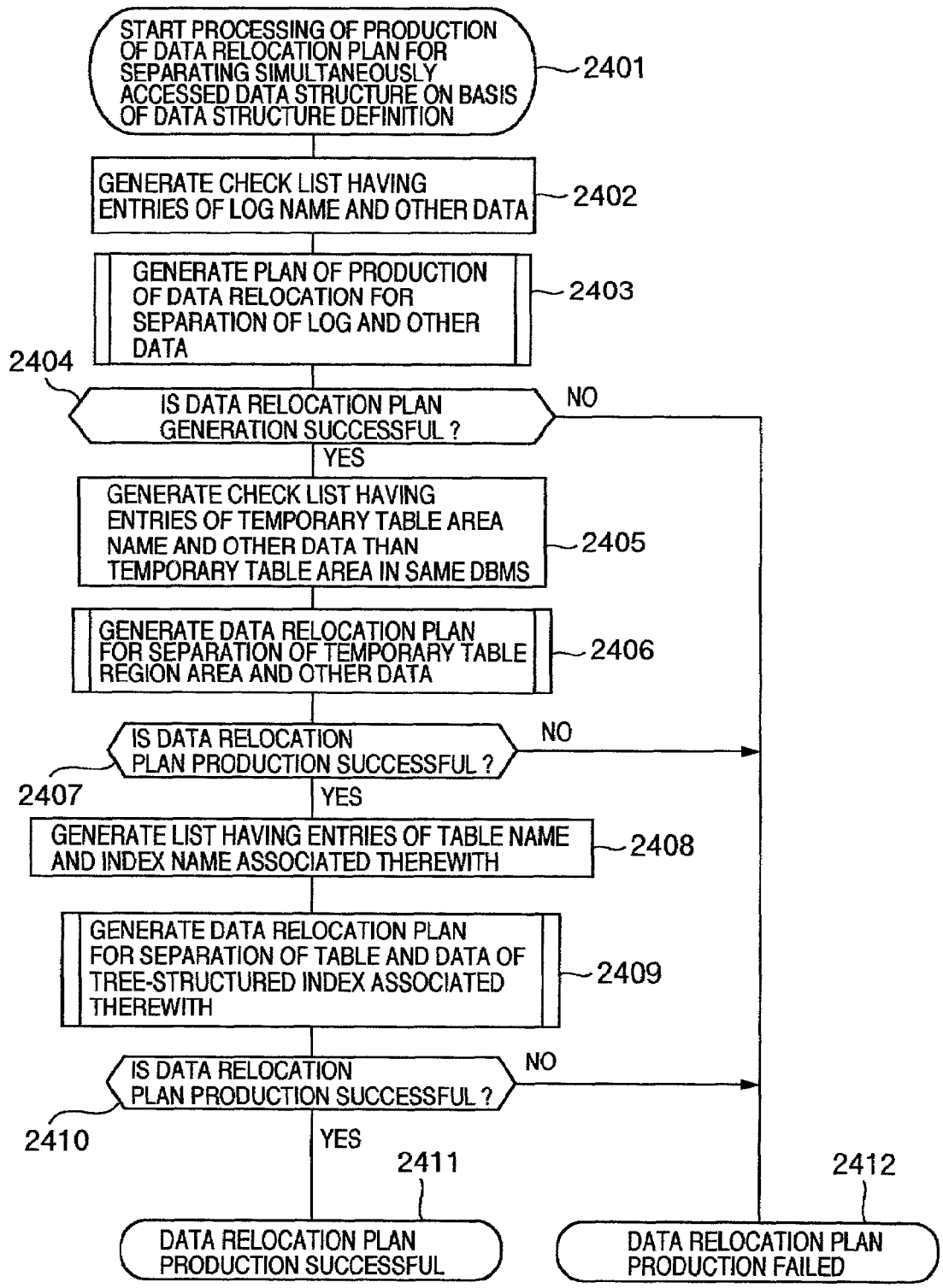
FIG. 21 is a processing flowchart of data relocation plan creating operation to separate the simultaneous access execution data structures based on data structure definition.

Shown in FIG. 21 is a processing flowchart of operations in the data relocation plan creating process to separate simultaneous access execution data structures on the basis of the data structure definition as a third data allocation analysis/data relocation plan creating process. In the process, the system confirms whether or not a pair of data structures with a high simultaneously access probability, such as a log and other data, a temporary table area and other data, and table data and index data of a tree structure created correspondingly are stored in the same physical storage device 18. If there is such a portion, the system creates a data relocation plan to solve the problem.

The process starts with a step 2401. In a step 2402, the system refers to the DBMS data structure information 621, and acquires, as a set, the data structure name 561 of all logs and the DBMS name 631 of the DBMS 110 utilizing it. And the system creates a check list, as sets, of the data structure name of logs and the data structure names of other than logs for separating them and goes to a step 2403.

In the step 2403, the system executes the data relocation plan creating operation for data structure separation started from the step 2301 with use of the check list created in the step 2402. In a step 2404, the system confirms whether or not the data relocation plan creating operation in the step 2403 was successful. When successful, the system goes to a step 2405. When unsuccessful, the system proceeds to a step 2412 to terminate its operation as a failure in the data relocation plan creating operation.

In the step 2405, the system refers to the DBMS data structure information 621; and acquires, as a set, the data structure name 561 of all temporary table areas and the DBMS name 631 of the DBMS 110 utilizing it. And the system creates a check list, as sets, of data structure name of temporary table area and the data structure names of other than temporary table area for separating them for separation between them, and goes to a step 2406.

In the step 2406, the system executes the data relocation plan creating operation for the data structure separation started from the step 2301 with use of the check list created in the step 2405. In a step 2407, the system confirms whether or not the data relocation plan creating operation in the step 2406 was successful. When successful, the system goes to a step 2408. When unsuccessful, the system goes to a step 2412 to terminate its operation as a failure in the data relocation plan creating operation.

In the step 2408, the system refers to the DBMS index definition information 624, and acquires the index names 635 for all tree-structured indexes and data structure names of a corresponding table from the correspondence table information 637. And the system creates a check list of, as sets, the index names 635, the data structure names of the corresponding table, and the DBMS names 631 of the DBMS 110 holding them; and then goes to a step 2409.

In the step 2409, the system executes the data relocation plan creating operation for data structure separation started from the step 2301 with use of the check list created in the step 2408. In a step 2410, the system confirms whether or not the data relocation plan creating operation in the step 2409 was successful. When successful, the system goes to a step 2411 to terminate its operation as a success in the data relocation plan creating operation. When unsuccessful, the system goes to a step 2412 to terminate its operation as a failure in the data relocation plan creating operation.

Figure 22:
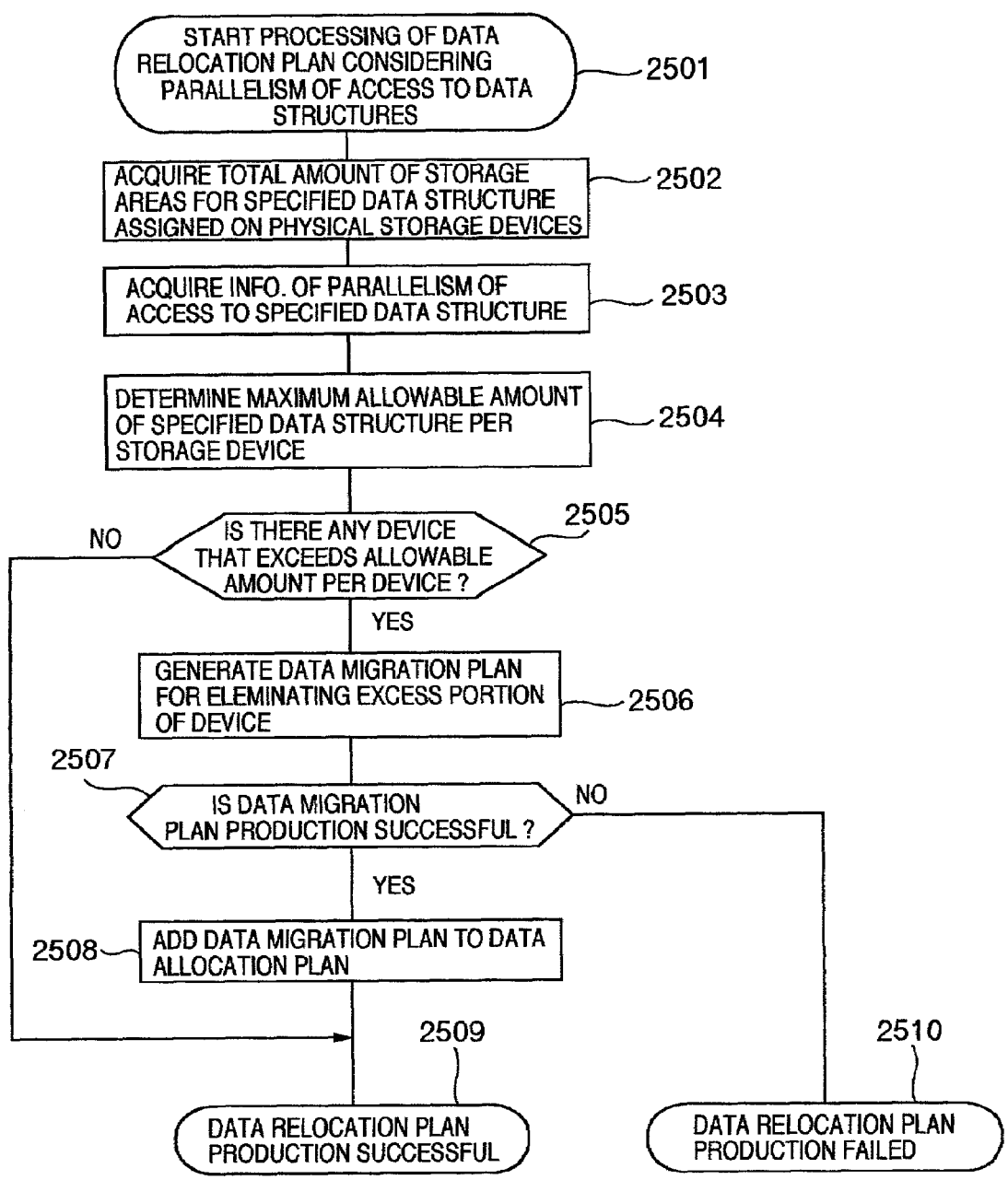
FIG. 22 is a processing flowchart of data relocation plan creating operation taking a degree of access parallelism into consideration.

Shown in FIG. 22 as a fourth data allocation analysis/data relocation plan creating process is a processing flowchart of data relocation plan creating operations. In this process, the parallelism of operations at the time when data are accessed randomly is considered to perform data relocation to solve disk bottlenecks. At the time of executing this operation, a data structure to be confirmed for the data relocation is specified as a set of the DBMS name 631 and data structure name 561.

The process starts with a step 2501. In a step 2502, the system finds a total amount of storage areas allocated on the physical storage device 18 of the specified data structure. This value is determined by referring to the data structure data amount 641 of DBMS data structure information 621.

In a step 2503, the system refers to the DBMS data structure information 621 and acquires the maximum access parallelism 569 in the specified data structure. In a step 2504, the system finds a value obtained by dividing the storage area use total amount of the specified data structure found in the step 2502 by the maximum access parallelism 569 found in the step 2503, as a maximum amount allowable to be allocated onto one storage device 18 of the specified data structure. Due to this restriction, the specified data structures can be stored as dispersed in a number of the storage devices 18 corresponding in number to the maximum access parallelism 569 or more. Thus even when data of specified data structure are accessed randomly with the maximum access parallelism 569, this enables less generation of the disk bottleneck. The value of the allocatable maximum amount may be further increased or decreased from the value found by this method, taking actual access characteristics into account.

In a step 2505, the system confirms whether or not the amount of data of the specified data structures allocated to one storage device 18 exceeds the maximum amount found in the step 2504 with use of the data relocation work information 670. If such data does not exist, the system goes to a step 2509 to terminate its operation as a success in the data relocation plan creating operation. Otherwise, the system goes to a step 2506.

In the step 2506, the system creates a data migration plan to solve a part of the data allocated on one storage device 18 exceeding the maximum amount found in the step 2504. At this time, it is required that a data migration amount to be considered in creating the migration plan be not smaller than a part of data of the specified data structure currently allocated onto the storage device 18 corresponding to an excess beyond the maximum amount found in the step 2504. It is also required, after the migration, that even the storage device 18 not exceed the maximum amount found in the step 2504.

In a step 2507, the system confirms whether or not the data migration plan creating operation of the step 2506 was successful. When successful, the system proceeds to a step 2508. When unsuccessful, the system proceeds to a step 2510 to terminate its operation as a failure in the data relocation plan creating operation.

In the step 2508, the system stores the created data migration plan in the migration plan information 750, and goes to a step 2509 to terminate its operation as a success in the data relocation plan creating operation.

Figure 23:
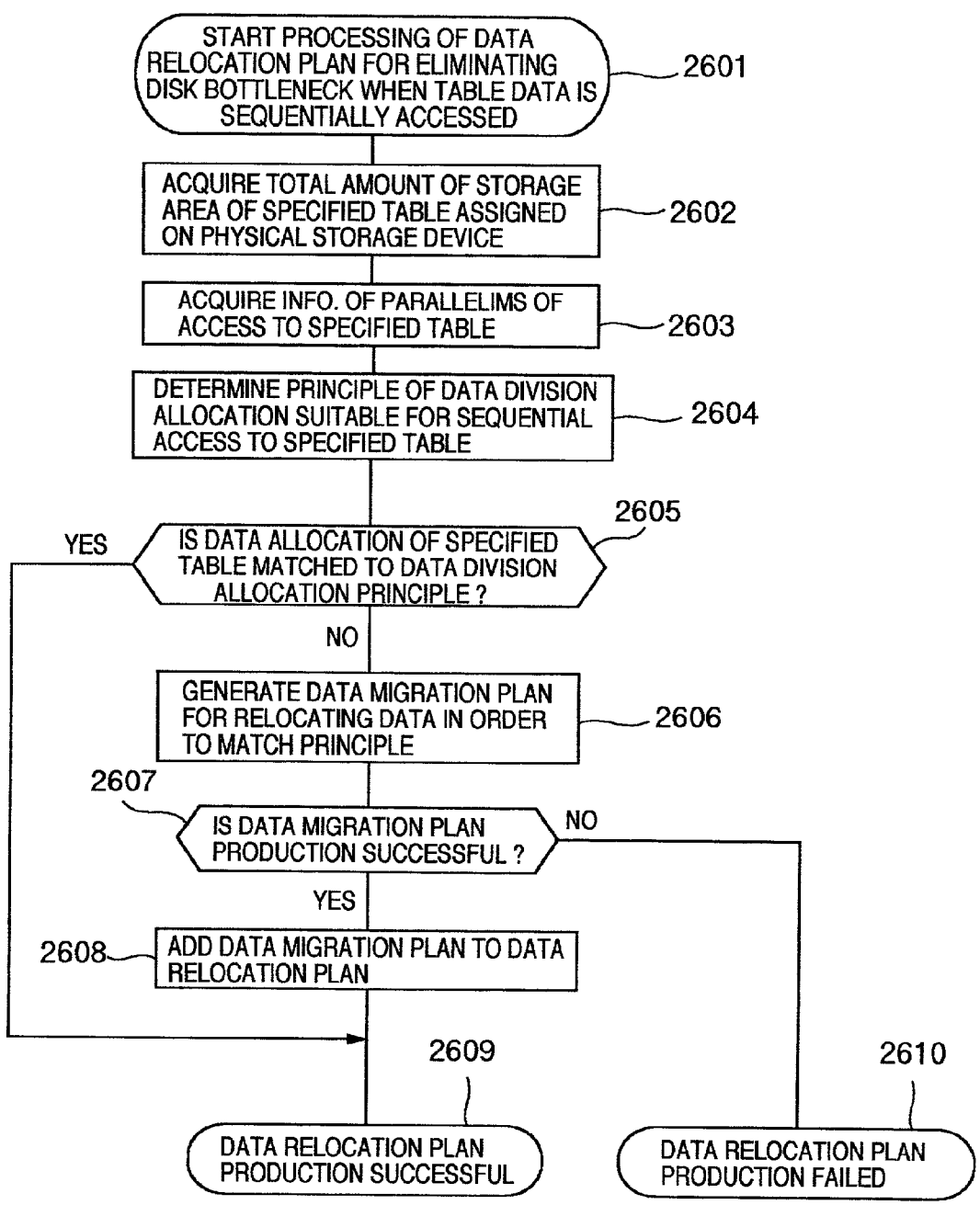
FIG. 23 is a processing flowchart of data relocation plan creating operation to solve a disk bottleneck at the time of sequentially accessing specific table data.

Shown in FIG. 23 as a fifth data allocation analysis/data relocation plan creating process is a processing flowchart of data relocation plan creating operations to solve a disk bottleneck at the time of sequentially accessing data of a specific table. At the time of executing this process, a table to be confirmed for data relocation is specified as a set of the DBMS name 631 and data structure name 561.

Sequential access methods are already determined for different DBMS's 110. Thus the types of the DBMS's 110 to be used are narrowed so that the data position management main program 130 can previously grasp the sequential access method of the DBMS 110 for its optimization. The sequential access method of the DBMS 110 is assumed to be carried out as follows. When it is desired to sequentially access the data of a data structure, the system sorts the data file path names 562 and file block numbers 563 having the data structure stored therein in an ascending order, and executes access thereto in this order.

There is another sequential access method wherein a set of internal ID numbers for management of data files and file block numbers files 563 are accessed in an ascending sorting order. The data position management main program 130 selects the proper sequential access method according to DBMS 110.

When sequential accesses are carried out in parallel, the areas are assumed to be divided equally by access parallelism with the sorted order on sequential access operation above-described.

It is not necessarily practical to arrange all of one access area after division by the parallel access onto the same storage device 18. For this reason, when continuous access areas of a certain amount or more after the division are stored onto one physical storage devices continuously, the system judges that this allocation is allowable. However, pair of data which are not accessed continuously in any case, and belong to the access areas classified differently after division operations are likely to collide at the time of parallel sequential access. To avoid this, a guideline is provided that such pair of data should be stored in different storage devices 18, so that, when data allocation is created according to the guideline, the performance of the sequential access can be increased.

The process starts with a step 2601. In a step 2602, the system finds a total amount of storage areas allocated onto the physical storage device of the specified table. These values are obtained by referring to data structure data amount 641 of the DBMS data structure information 621. In a step 2603, the system refers to the DBMS data structure information 621 and acquires the maximum access parallelism 569 in the specified data structure.

In a step 2604, an amount obtained by dividing the total amount of storage area usage of the specified table found in the step 2602 by the maximum access parallelism 569 found in the step 2603 corresponds to a data amount of one area to be sequentially parallel-accessed. Based on the method of determining the sequential access order grasped by the data position management main program 130, the system finds a storage region in a data file of the specified structure in the DBMS data storage position information 622 predicts the access method in such a manner as mentioned above, and creates the aforementioned data division guideline on the basis of its result on the assumption that the parallel access of the maximum access parallelism 569 is executed.

In a step 2605, the system refers to the data relocation work information 670, and confirms whether or not data allocation of the specified data structure was carried out onto the storage devices 18 according to the above-mentioned data division guideline created in the step 2604. If so, then the system goes to a step 2609 to terminate its operation as a success in the data relocation plan creating operation. If not, then the system goes to a step 2606.

In the step 2606, the system finds a data allocation according to the data division guideline found in the step 2604. At this time, when the data are stored as divided into small areas of a certain constant value or less, the system searches for large continuous free areas, and creates a data migration plan to migrate the such data into the searched areas to keep the sequential access structure. Or the system creates such a data migration plan that data to be separated into different access areas by the parallel access of the maximum access parallelism 569 are not arranged on the same storage device 18.

In a step 2607, the system confirms whether or not the data migration plan creating operation of the step 2606 was successful. When successful, the system goes to a step 2608; whereas, when unsuccessful, the system goes to a step 2610 to terminate its operation as a failure in the data relocation plan creating operation.

In the step 2608, the system the created data migration plan in the migration plan information 750, and proceeds to a step 2609 to terminate its operation as a success in the data relocation plan creating operation.

Explanation will next be made as to a data relocation plan creating process as a sixth data allocation analysis/data relocation plan creating process, taking the cache effect of the storage apparatus 10 to the specified data structure into consideration. At the time of executing this process, the system specifies the DBMS name 631 and data structure name 561 as a data structure to be confirmed for data relocation. During the process execution, it may also explicitly specify the presence or absence of the cache effect of the storage apparatus. As mentioned above, in the storage device structure information 134, some storage apparatuses 10 may hold no value for the data cache capacity 602. For this reason, one of the storage apparatuses 10 having the ineffective value of the data cache capacity 602 will not be treated in the present process.

In this process, the system judges whether or not the cache effect of the storage apparatus 10 in the specified data structure exists. The system first calculates an average cache usage amount in the host cache per unit data amount of the data structure. On the basis of its calculated result, the system judges whether or not a sufficient amount of host cache can be available. When a sufficient amount of host cache is available, only data having low access frequencies are read out of the storage apparatus, resulting in that the cache effect of the storage apparatus should become quite low.

Figure 24:
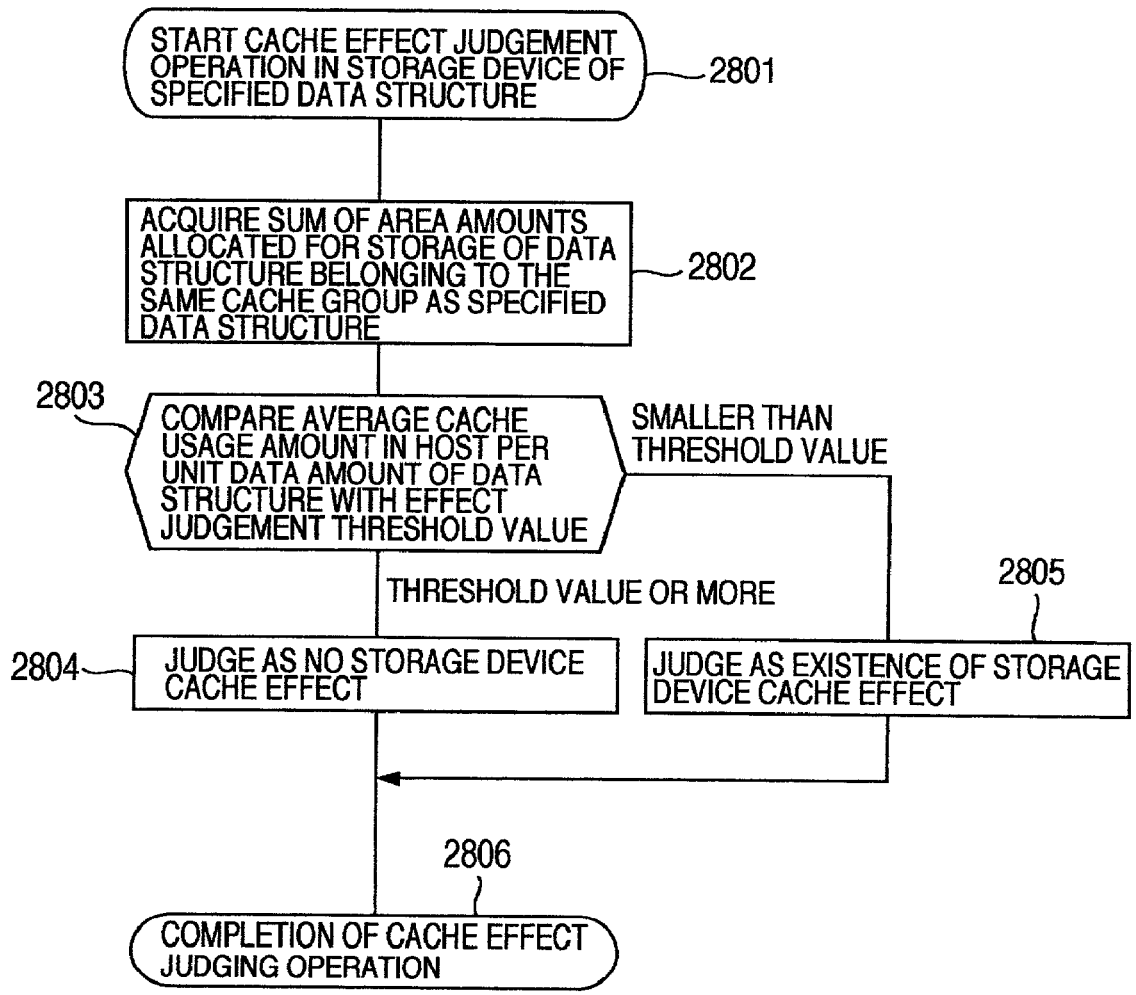
FIG. 24 is a processing flowchart of cache effect judging operation for use in the data relocation plan creating operation taking a cache effect in the storage apparatus 10 to a specific data structure into consideration.

A flowchart for the confirming process is shown sin FIG. 24. The process starts with a step 2801. In a step 2802, the system refers to the DBMS cache structure information 625, finds a cache group to which the specified data structure belongs, and finds a total amount of areas allocated for the storage of the data structure belonging to the same cache group by referring to the DBMS data storage position information.

In a step 2803, the system finds a cache size 566 allocated to the cache group to which the specified data structure from the DBMS cache structure information 625, finds an average cache usage amount in the host per unit data amount of the specified data structure from the total amount of areas found in the step 2802, and compares the found average usage amount with a predetermined cache effect threshold value. When the average usage amount per unit data amount is not smaller than the threshold value, the system goes to a step 2804, determines that the specified data structure has no cache effect in the storage apparatus, and goes to a step 2806 to terminate its operation. When the average usage amount is smaller than the threshold value, the system goes to a step 2805, determines that the specified data structure has the cache effect in the storage apparatus, and goes to a step 2806 to terminate its operation.

In the present process, the system judges the cache usage amount of the data structure in the storage apparatus 10. At this time, an actual data cache usage amount depends on an access pattern. However, it is assumed in this cases that a general case is considered, that is, the cache usage amount of the data structure is proportional to a data amount allocated to the storage apparatus 10. More specifically, the system refers to the storage device volume physical storage position management information 603 from the storage device structure information 134, finds a total data storage capacity in the storage apparatus 10, and finds a data cache capacity from the data cache capacity 602. The system finds a data cache amount per unit data capacity from these values, and determines the cache effect on the basis of the data cache amount. It is also possible in the storage apparatus 10 to divide provided volumes into several groups and to perform such control as to change the cache usage amount per unit capacity in each of the groups. In this case, the cache usage amount of the data structure is varied for each storage area such as volume, and this effect should be considered. To realize this, the system gathers the information from storage apparatus 10 about this cache management on storage apparatuses 10.

Figure 25:
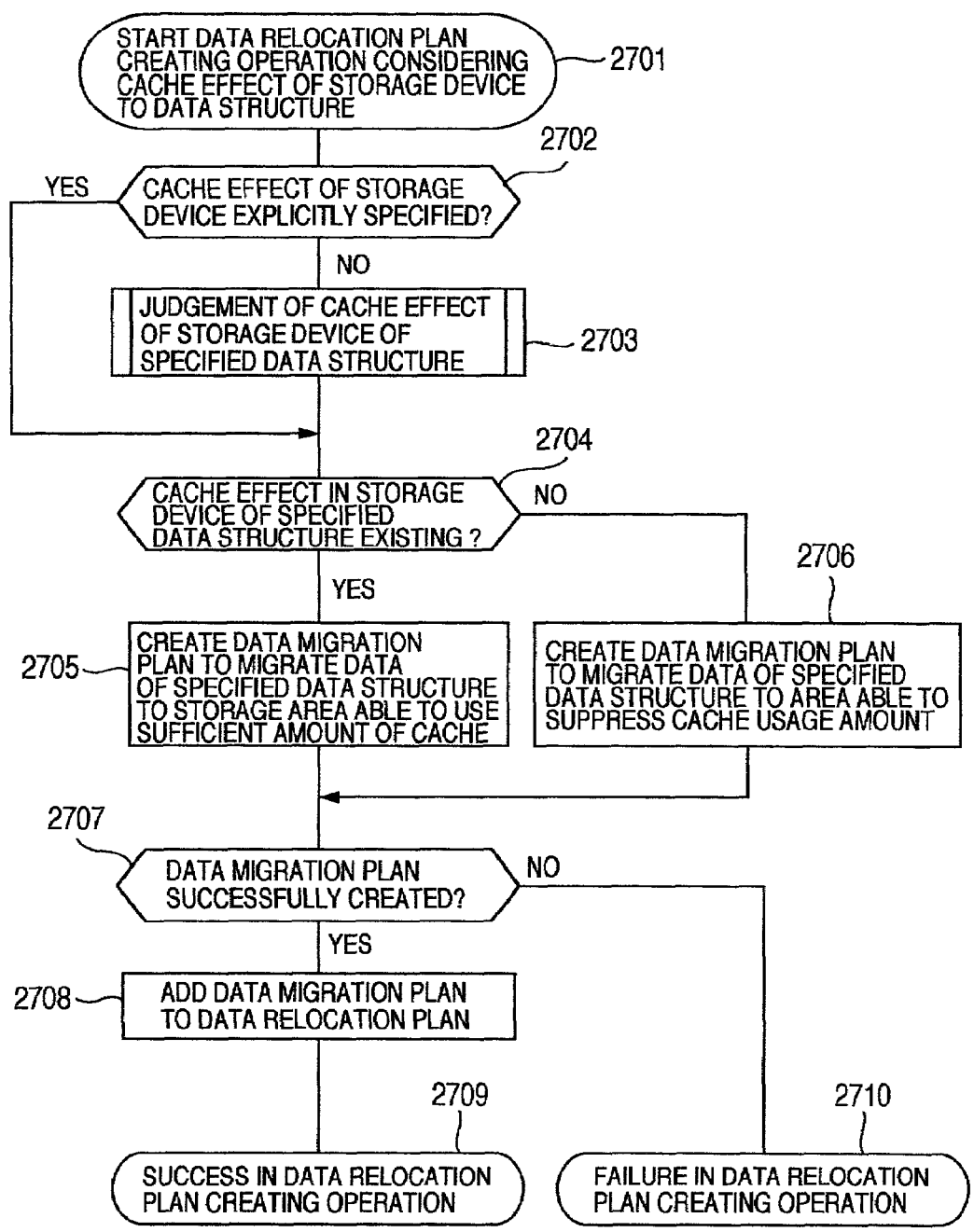
FIG. 25 is a processing flowchart of data relocation plan creating operation considering the cache effect of the storage apparatus 10 to a specific data structure.

Shown in FIG. 25 is a processing flowchart of operations of a data relocation plan creating process taking the cache effect of the storage apparatus 10 on a specified data structure into consideration. The process starts with a step 2701. In a step 2702, the system confirms whether the existence of the cache effect was explicitly specified to the specified data structure to be created for a data relocation plan at the time of starting the process. When the cache effect is not explicitly specified, the system proceeds to a step 2703, whereas, when the effect is explicitly specified, the system proceeds to a step 2704.

In the step 2703, the system performs confirming operation started from the step 2801 to check the existence of the aforementioned cache effect of the storage apparatus 10 on the specified data structure.

In the step 2704, the system confirms the existence of the cache effect of the storage apparatus 10 on the specified data structure. When determining that the cache effect exists, the system goes to a step 2705; whereas, when determining that the cache effect does not exist, the system goes to a step 2706.

In the step 2705, the system creates a data migration plan to migrate data of the specified data structure to a storage area such as device or volume where a sufficient amount of cache is available. The expression 'storage area where a sufficient amount of cache is available' means herein, on principle, a storage area having a large cache usage amount per unit capacity, but also has such a meaning as following. When the amount of the specified data structure stored in the host cache is large, a part of the specified data structure having a high access frequency remains in the host caches. Thus, when the cache usable capacity for the storage area is not large compared with the usable amount of the host cache, the cache effect in the storage area is considered to be small. For this reason, the system calculates a ratio in average cache usage amount between the average cache usage amount of the host cache per unit data amount of the data structure and the average cache usage amount per unit capacity of the storage area, compares the calculated value with its pre-determined judgement threshold value, and determines that a sufficient amount of cache can be used, only when the comparison result shows that the amount of cache used for the storage area is larger than the amount of the host cache. After this process, the system goes to a step 2707.

In the step 2706, the system creates a data migration plan to migrate the data of the specified data structure to an area where the cache usage amount can be suppressed to a small value, that is, to migrate the data to an area such as device or volume having small average cache usage amount per unit capacity of the storage device, and then goes to a step 2707.

In the step 2707, the system confirms whether or not the data migration plan was successfully created. If successful, then the system proceeds to a step 2708; whereas, if unsuccessful, then the system proceeds to a steps 2710 to terminate its operation as a failure in the data relocation plan creating operation.

In the step 2708, the system stores the created data migration plan to the migration plan information 750, goes to a step 2709 to terminate its operation as a success in the data relocation plan creating operation.

There is only a virtual volume switch 72 in the configuration illustrated in the FIG. 1. The present embodiment of the invention can apply to the configuration where there are many virtual volume switches 72 and a virtual volume switch 72 is not necessarily connected to all DB hosts 80 and storage apparatuses 10. In such case, the data location management program 130 gathers the virtual volume information 73 from all virtual volume switches 72. The data location management program 130 also gathers the information about the connections among DB hosts 80, virtual volume switches 72, and storage apparatuses 10, and make the data relocation plans with the consideration of this information about the connection in order to avoid to make improper data relocation plan. Further, in the virtual volume migration plan information 751, the information s where the migration plan in each entry should be issued is recorded.

Second Embodiment

With the present embodiment, in a computer system for execution of a DBMS, where computers and storage apparatuses are connected, a computer for management of data storage position is present to manage whole storage positions of data in the computer system. A file system or volume manager in the OS to be run on the computer has a function of dynamically changing data storage positions, even the storage device has a function of dynamically changing the storage positions of data in the storage device.

The computer for management of data storage position acquires information on DBMS, information on mapping of data storage position and information on the structure of the storage devices, and on the basis of the acquired information, creates a suitable data relocation plan. The system instructs the file system, volume manager and storage devices of the created data allocation to realize the data allocation in accordance with the data relocation plan using the data relocation function.

Figure 26:
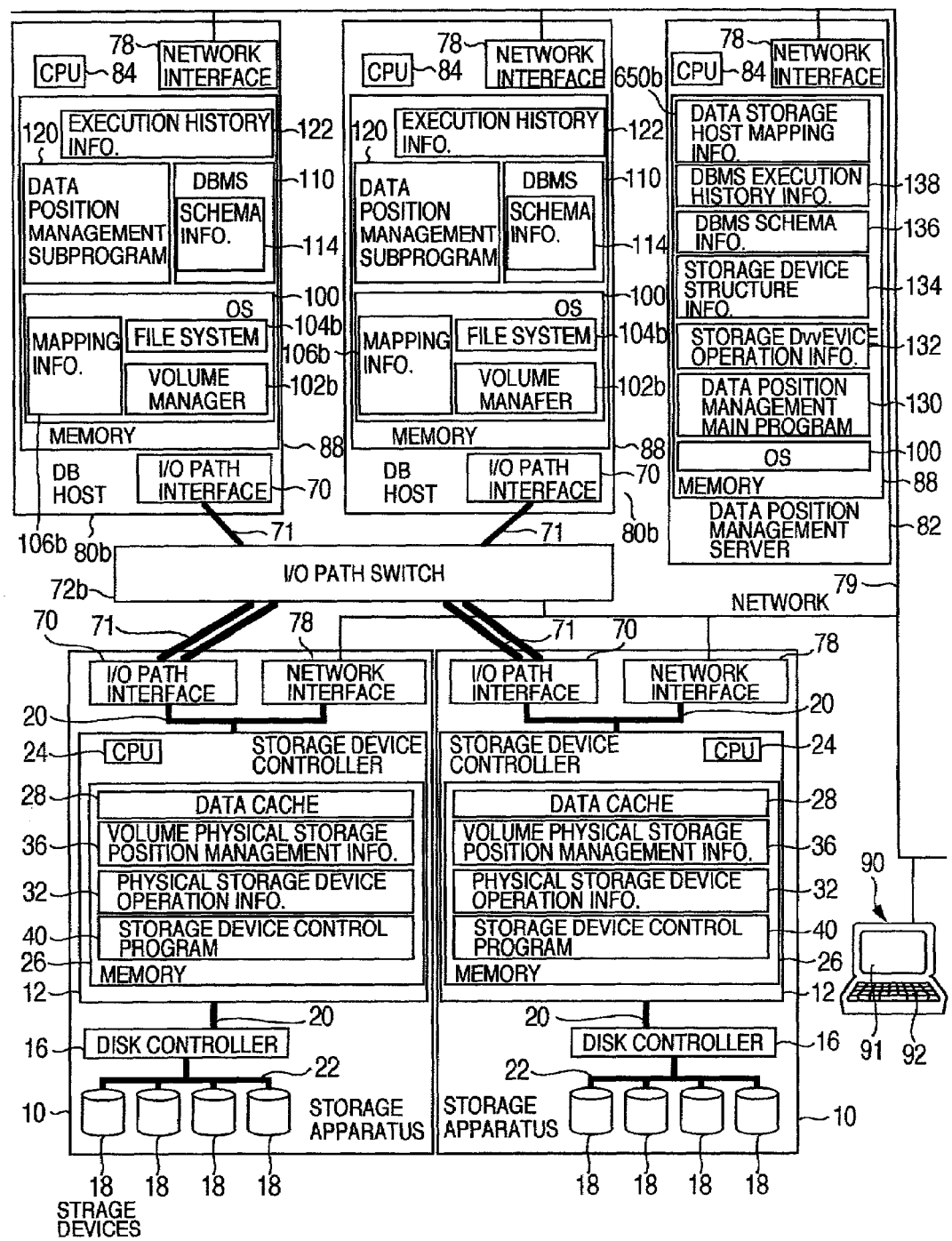
FIG. 26 shows a configuration of a computer system in accordance with a second embodiment of the present invention.

FIG. 26 is a configuration of a computer system in accordance with a second embodiment of the present invention. As illustrated, the second embodiment of the present invention is different from the first embodiment of the present invention in the following respects. In the drawing, parts having the same or equivalent functions as those in the first embodiment are denoted by the same reference numerals.

The virtual volume switch 72 in the first embodiment is changed to an I/O path switch 72*b*, and is not connected to the network 79. The volume manager 102 of the OS 100 to be executed by the DB host 80*b* in the first embodiment is changed to a volume manager 102*b*, the file system 104 is changed to a file system 104*b*, and the mapping information 106 held by the OS 100 is changed to mapping information 106*b*, with a slight change in contents from the first embodiment. The data storage position management information 140 stored in the data position management server 82 in the first embodiment is changed to host mapping information 650*b* with contents of the host mapping information 650 in the data storage position management information 140 being slightly changed.

The I/O path switch 72*b* has only a function of performing route control when compared to the virtual volume switch 72. In the present embodiment, the I/O path 71 for data transfer between the storage apparatus 10 and DB host 80*b* are provided as separated from the network 79. However, a technique such as iSCSI to implement data transfer between a computer and storage device on a network is already developed. Thus such a technique may be applied even to the present embodiment. At this time, in the storage apparatus 10 and DB host 80*b*, the I/O path interface 70 is omitted, and the I/O paths 71 and I/O path switch 72*b* are omitted from the computer system.

The volume manager 102*b*, when compared to the volume manager 102, has a function of migrating data stored in an specified area of a logical volume provided by the volume manager 102*b* into a storage area specified in the volume provided by the specified storage apparatus 10. Even when the volume manager does not have such a function directly, the volume manager having a function of dynamically changing configuration of a management area and a function of migrating data for each management unit in the management area can realize the aforementioned function by combining these functions. This data migration function can be realized by means of a management command to be executed on the host.

The file system 104*b*, when compared to the file system 104, has a function of migrating part of file data to one of areas managed by the file system 104*b* and where no data is stored. In order to instruct the data migration, a file to be migrated, its data area and migration destination area are specified. The data migration function is executed by a management command to be executed on the host.

A defragmentation function of the file system is an example of the function of dynamically changing the data storage position of the file. The above data migration function can be realized with the extension which enables to specify the data migration destination area. An area which can be used as a data migration destination can be grasped by referring to the mapping information 106*b*.

In the present embodiment, either one of the volume manager 102*b* or file system 104 is only required to have the data migration function. When the file system 104*b* has the data migration function, the present embodiment can be applied to the system in which the volume manager 102*b* does not exist.

FIG. 27 shows mapping information 106*b* stored in the OS 100. The summary of a point changed from the mapping information 106 of FIG. 4 is that part of the mapping information 106 by which the areas from the virtual volume provided by the virtual volume switch 72 are managed is changed to one by which the areas from volume provided by the storage apparatus 10 in the mapping information 106*b*, and a file system ID 535 not held in the file storage position information 530 and empty area management information are added to file storage position information 530b.

Included in the mapping information 106b are volume raw device information 520b, file storage position information 530b and logical volume structure information 540b. The volume raw device information 520b contains, as a set, a raw device path name 521 as an identifier to specify a raw device in the OS 100, a storage device name 583 as the identifier of the storage apparatus 10 when the volume provided by the storage apparatus 10 as the raw device is used, and a raw device volume name 522b as the identifier of the volume or logical volume accessed by the raw device.

The logical volume structure information 540b contains, as a set, a file path name 531 as an identifier to specify a file in the OS 100, a file system ID 535 as an identifier in the host of the file system having the file present therein, a file block number 532 as a block number to specify a data position in the file, a file allocation volume name 533b as the identifier of the volume or logical volume provided by the storage apparatus 10 having corresponding data stored therein, a storage device name 583 when the volume provided by the storage apparatus 10 is used, and a file allocation volume block number 534 as a data storage position on the volume. An entry 536 having the file path name 531 of 'Empty' is a special entry which indicates an area with no valid data in the file system. To this area, data migration can be carried out.

The logical volume structure information 540b contains, as a set, a logical volume name 541 as the identifier of the logical volume provided by the volume manager 102b, a logical volume logical block number 542 indicative of the position of data on the logical volume, a volume name 501 as the identifier of the volume provided by the storage apparatus 10 having the logical block stored therein, a storage device name 583 provided thereby, and a logical block number 512 as a storage position on the volume.

Figure 28:
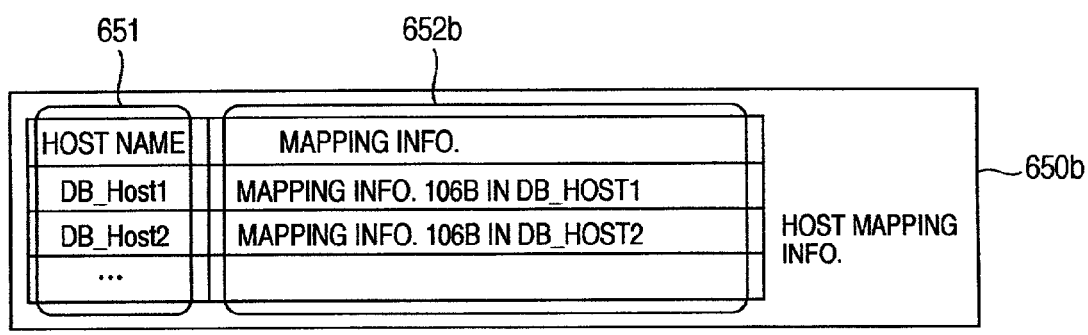
FIG. 28 shows host mapping information 650*b* stored on the data position management server 82.

Shown in FIG. 28 is host mapping information 650b stored on the data position management server 82. A point changed from the host mapping information 650 of FIG. 12 is that mapping information 652 holding the mapping information 106 for each host is changed to mapping information 652b holding the mapping information 106b for each host.

The fact that part of the data relocating operation holding the data migration function is changed from the virtual volume switch 72 to the volume manager 102b and file system 104b causes the following changes in the data relocating operation.

In the volume manager 102b and file system 104b, data migration operation is invoiced by execution of a management command on the DB host 80b. Thus the data position management main program 130 issues, through the network 79 to the data position management subprogram 120 being executed on the DB host 80b, an instruction to execute the management command for performing the data migration in the volume manager 102b and file system 104b, and the data position management subprogram 120 executes the management command to correspondingly execute the data migration.

In this connection, in the volume manager 102b, when the data position management main program 130 issued a migration instruction, there is a possibility that the area to be used as the data migration destination is not present under control of the volume manager 102b. In this case, the data position management subprogram 120, prior to execution of the management command of the data migration, executes such a management command as to put the migration destination area under control of the volume manager 102b.

After the data migrating operation is completed, in order that the volume manager 102b on another DB host 80 can utilize the area of the current data migration source as a data migration destination later, the program executes such a management command as to free the data migration source area.

In the data relocation plan creating operation, the data relocation work information 670 of a work area used at the time of creating a data relocation plan is changed to the data relocation work information 670b, and the migration plan information 750 is changed to the migration plan information 750b.

FIG. 29 shows data relocation work information 670b. The data relocation work information 670b contains work storage device volume storage position information 682, work empty area information 683 and data structure virtual-volume position information 690b. When compared with the data relocation work information 670 of FIG. 14, the virtual volume physical storage position information 680 is divided and changed to the work storage device volume storage position information 682 and work empty area information 683, and the data structure virtual-volume position information 690 is changed to the data structure virtual-volume position information 690b.

The work storage device volume storage position information 682, which is a list of volumes provided by the storage apparatus 10 and storage positions in the storage devices 18, holds, as a set, a storage device name 583, a volume name 501, a logical block number 512, a physical storage device name 502 and a physical block number 514. The data are initialized by referring to the storage device structure information 134s.

The work empty area information 683, which is used to manage a position as a data migration destination at the time of creating a data relocation plan, holds, as a set, a DBMS name 631, a file system ID 535, a logical volume name 541, a logical volume logical block number 542, a storage device name 583, volume name 501, a logical block number 512, a physical storage device name 502 and a physical block number 514. The data of the work empty area information 683 are initialized by referring to the host mapping information 650b and storage device structure information 134. Among the data, an entry having the effective values of the DBMS name 631 and file system ID 535 indicates an area which can be used as a data migration destination in the file system 104b identified by these data. The area is grasped from the file storage position information 530b in the host mapping information 650b. This area can be used as the migration destination of data present in the file system 104b.

An entry, which has no values in the DBMS name 631 and file system ID 535 but having an effective value in the volume name 501, indicates a storage area in the volume of the storage apparatus 10 not used by any host. And the entry is grasped as one of all areas provided by the storage apparatus 10 grasped by the storage device structure information 134 except for in-use areas grasped by the host mapping information 650b. The grasped area can be used as a data migration destination in the volume manager 102b. An entry having no value in the volume name 501 indicates an area usable as a data migration destination in the storage apparatus 10 and can be grasped from the storage device structure information 134.

The data structure virtual-volume position information 690b indicates a place where the data structure held by the DBMS 110 is stored in the volume provided by the storage apparatus 10. The information 690b contains, as a set, a host name 651, a DBMS name 631, a data structure name 561, a data file path name 562, file system ID 535, a file block number 563, a storage device name 583, a volume name 501 and a volume logical block number 512. Data of these information are initialized by referring to the DBMS data storage position information 622, DBMS host information 626 and host mapping information 650b in the DBMS schema information 136 and by combining corresponding parts thereof relating to the file (raw device) path and (logical) volume.

FIG. 30 shows migration plan information 750b. The migration plan information 750b contains logical volume migration plan information 753 storing a data migration instruction to the volume manager 102b, file block migration plan information 754 storing a data migration instruction to the file system 104b, and physical storage position migration plan information 752 storing a data migration instruction to the storage apparatus 10. These information are initialized so as not to have any data. In the migration plan information 750b, when compared to the migration plan information 750 of FIG. 16, the physical storage position migration plan information 752 is deleted, and the logical volume migration plan information 753 and file block migration plan information 754 are added.

The logical volume migration plan information 753 contains, as a set, a migration sequence 761, a host name 631 for migrating operation, a migration logical volume name 773 and migration logical volume block number 774 for specifying a migration source volume and its area, a migration destination storage device name 764, migration destination volume name 765 and migration destination volume block number 766 for specifying the storage apparatus 10 as the migration destination and its storage area. The file block migration plan information 754 contains, as a set, a migration sequence 761, a host name 651 for migrating operation, a file system ID 535, a migration data file path name 775, a migration file block number 776 for specifying a migration source file and its area, a migration destination storage device name 764, a migration destination volume name 765, and a migration destination volume logical block number 766 for specifying a migration destination area.

In the explanation about the present embodiment of the invention till now, there is no description how to apply this invention to the configuration where a DB hosts 80 cannot necessarily access all storage apparatuses 10. In such a case, the data allocation management program 130 gathers the information about the accessibility on all DB hosts 80 and make the data relocation plans with the consideration of this information about the accessibility in order to avoid to make improper data relocation plan.

Also, the combination of the first embodiment and the second embodiment of the invention can be considered. In this case, the data location management program 130 gathers all information s which are utilized by the first embodiment or the second embodiment and make the data relocation plans taking account of the increased number of mapping layers where the data migration function exists by combining the first embodiment and the second embodiment.

Third Embodiment

With the present embodiment, in a computer system wherein computers for execution of DBMS's are connected to storage apparatuses in which storage regions are managed by the unit of files through a network, a computer for management of data storage position is present to manage the whole storage positions of data in the computer system. A network file system in the OS executed in the computer has a function of combining a plurality of files into a single file and dynamically changing its structure. The storage apparatus also has a function of dynamically changing the storage position of data in the storage apparatus.

The computer for management of the data storage position acquires information on the DBMS, information on the mapping of the data storage position, and storage apparatus structure information; and creates a suitable data relocation plan using these information and instructs data migration to the network file systems and the storage apparatuses in order to realize the data allocation based on the data relocation plan.

Figure 31:
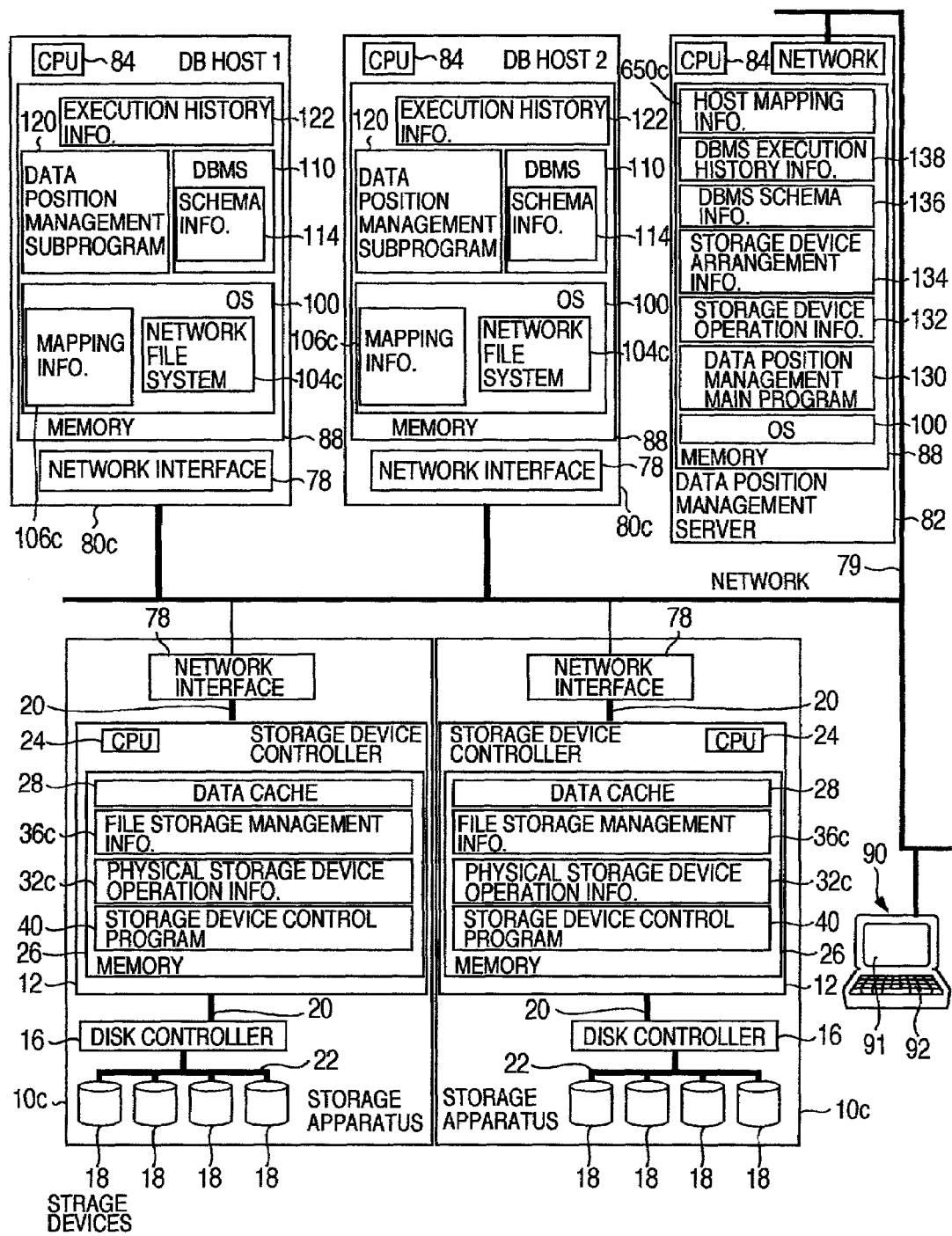
FIG. 31 shows a configuration of a computer system in accordance with a third embodiment of the present invention.

FIG. 31 is a configuration of a computer system in accordance with a third embodiment of the present invention. As illustrated, the present third embodiment is different from the first embodiment of the present invention in following respects. In the drawing, parts having the same or equivalent functions as or to those in the first embodiment are denoted by the same reference numerals.

In the present embodiment, the I/O path interface 70 and virtual volume switch 72 are omitted, and the storage apparatuses 10c and DB hosts 80c are interconnected only by means of the network 79. The storage apparatus 10 is changed to the storage apparatus 10c for management of storage of data on a file basis. For this reason, the physical storage device operation information 32 and volume physical storage position management information 36 are changed to the physical storage device information 32c and file storage management information 36c respectively.

In the OS 100 to be executed by the DB host 80c, the volume manager 102 and file system 104 are deleted, and instead, a network file system 104c is added, and the mapping information 106 held by the OS 100 is changed to the mapping information 106c. The storage device operation information 132, storage device structure information 134 and data storage position management information 140 stored in the data position management server 82 are changed to the storage device operation information 132c, storage device structure information 134c and host mapping information 650c slightly changed in the contents of the host mapping information 650 in the data storage position management information 140, respectively.

The storage apparatus 10 is changed to the storage apparatus 10c for management of data on a file basis. An access from the DB host 80c is carried out with a protocol based on a file. A volume in the storage apparatus 10 corresponds to a file or a file system in the storage apparatus 10c, and storage position management information for the file is the file storage management information 36c. A plurality of file systems may be provided in a single storage apparatus 10c.

The operation information of the physical storage device 18 in the storage apparatus 18 is gathered with the unit of volume. On the other hand, the operation information of the physical storage device 18 is gathered with the unit of file-system. Even when a file system is present in the storage apparatus 10c, the data migration function can be realized, and a method of instructing data migration is realized by specifying a file to be migrated, its data area and a migration destination area in the same manner as mentioned earlier. In the present embodiment, the data migration function in the storage apparatus 10c is indispensable.

The network file system 104c provides a function of accessing a file provided by the storage apparatus 10c. Further, the system provides a function to put a plurality of files togather into a single virtual file. In order to realize this function, the network file system 104c holds management information in the mapping information 106c, refers to this management information at the time of accessing the virtual file, and finds an actual access destination. The system also has a function of dynamically changing its structure. These operations are carried out by executing a management command on the DB host 80.

Shown in FIG. 32 is physical storage device information 32c held in the storage apparatus 10c. A point changed from the physical storage device operation information 32 of FIG. 2 is that the volume name 501 is changed to a file system name 1001, because the operation information acquisition unit is changed from the volume to the file system. Further, the operation information acquisition unit may be a file, in which case the volume name 501 is changed to a file system name 1001 and a file path name 1002.

FIG. 33 shows file storage management information 36c held in the storage apparatus 10c. A point changed from the volume physical storage position management information 36 are that the volume physical storage position main information 510 and volume data migration management information 511 are changed to file physical storage position information 510c and file data migration management information 511c respectively. The differences from the physical storage position management information 36 are as follows. The volume name 501 is changed to the file system name 1001 and file path name 1002. The volume logical block number 512 and migration logical block number 782 indicative of an data area in the volume are changed to a file block number 1003 or a migration file block number 1021, respectively.

An entry 1015 having the file path name 1002 of 'Empty' is a special entry which indicates one of areas of the storage device 18 in the storage apparatus 10c which is not allocated as a file storage area in the specified file system. The dynamic change function of the data physical storage position is realized by copying data to be migrated to this area according to the processing procedure explained in connection with the data migration scheme used in the volume data migration management information 511 in FIG. 3.

Attention should be now paid to the fact that the number of restriction in the data migration destination is increased at the time of creating a data migration plan. The present embodiment is allowed to have a plurality of file systems in a storage apparatus 10c. In general file systems, it is impossible for a file system to use an area managed by another file system. In other words, when general file systems are used, destination of a file migration is required to be limited in a file system having the file present therein. When such a mechanism is provided that a file system can use an area managed by another file system, however, this is not applied thereto.

Figure 34:
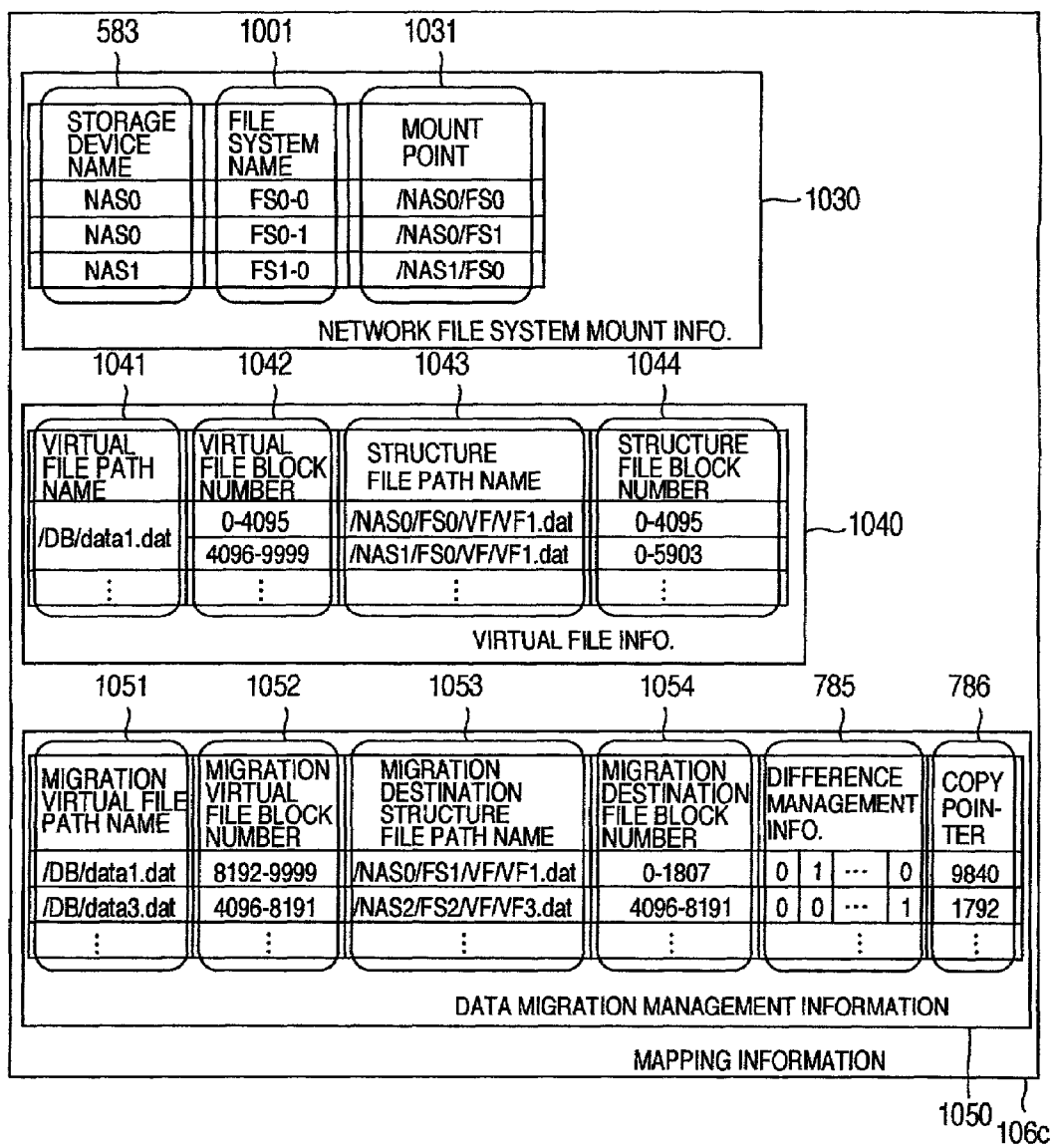
FIG. 34 shows mapping information 106*c* stored in the OS 100 of a DB host 80*c*.

FIG. 34 shows mapping information 106c stored in the OS 100 of the DB host 80c. Included in the mapping information 106c are network file system mount information 1030, virtual file information 1040 and data migration management information 1050.

The network file system mount information 1030 is one about the file system provided from the storage apparatus 10c and mounted in the DB host 80c. The information 1030 contains, as a set, a storage device name 583 as the supply source storage apparatus 10c of the file system, file system name 1001 as the identifier of the file system, a mount point 1031 as the mount point of the file system.

The virtual file information 1040 is used for management of a function of providing virtual files, which consist of a plurality of storage regions from the files provided by storage apparatus 10c, by network file system 104c. The information 1040 contains, as a set, virtual file path name 1041 as the identifier of the supplied virtual file, a virtual file block number 1042 indicative of its data area, a structure file path name 1043 as the identifier of a file actually holding data of the data area, and a structure file block number 1044 indicative of the storage area.

The data migration management information 1050 is part of the operation of changing the structure of the virtual file supplied by the network file system 104c and is used at the time of performing migration of the structure data. The information 1050 contains, as a set, a migration virtual file path name 1051 as the identifier of the virtual file of the migration source to be subjected to the data migrations, a migration virtual file block number 1052 indicative of an area for the data migration, a migration destination structure file path name 1053 and migration destination file block number 1054 indicative of a data migration destination file and a data migration destination area thereof, difference management information 785 and a copy pointer 786 as management information at the time of performing the data migration operation. The data migration destination has no restriction except that a solid storage area should be reserved in the migration destination specification area of the migration destination file. When the processing procedure explained in connection with the data migration scheme using the volume data migration management information 511 in FIG. 3 is used, the data migration function can be realized.

Shown in FIG. 35 is storage device operation information 132c stored on the data position management server 82c. A point changed from the storage device operation information 132 of FIG. 8 is that, although operation information has been acquired on a volume basis in the storage device operation information 132, operation information is acquired on a file-system basis in the storage device operation information 132c. For this reason, the volume name 501 is changed to the file system name 1001. Further, when the operation information is acquired on a file basis, the volume name 501 is changed as a set of the file system name 1001 and file path name 1002.

FIG. 36 shows storage device structure information 134c stored on the data position management server 82c. A point changed from the storage device structure information 134 of FIG. 9 is that the storage device volume physical storage position management information 603 storing the volume physical storage position main information 510 for each storage device is changed to storage device file physical storage position information 604c storing the file physical storage position information 510c for each storage apparatus 10c.

Figure 37:
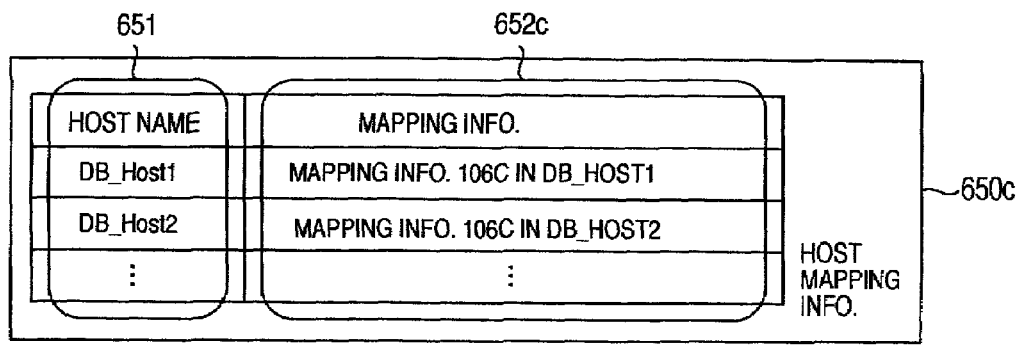
FIG. 37 shows host mapping information 650*c* stored on data position management server 82*c*.

Shown in FIG. 37 is host mapping information 650c stored on the data position management server 82c. A point changed from the host mapping information 650 of FIG. 12 is that the mapping information 652 holding the mapping information 106 for each host is changed to mapping information 652c holding the mapping information 106c for each DB host 80c.

The fact that the part holding the data migration function was changed from the virtual volume switch 72 to the network file system 104c and that the storage apparatus 10c was changed so as to perform its management on a file basis causes the following changes in the data relocation operation.

In the network file system 104c, when a management command on the DB host 80c is executed, data migration is carried out. Thus, when the data position management main program 130 issues an instruction through the network 79 to the data position management subprogram 120 being executed on the DB host 80c to execute the management command to perform the data migration in the network file system 104c, and when the data position management subprogram 120 correspondingly executes the management command, the data migration is carried out. At this time, since data migration is carried out to an area being currently empty, there may exist no file and no area in the file as a data migration destination area. When receiving such a data migration instruction, the network file system 104c creates a new file for the specified file and performs area extension. After successfully completing it, the program starts the data migrating operation to avoid a problem with lack of area during the data migration.

The network file system 104c performs the file creation or area extension utilizing a usual protocol. For this reason, its data storage destination is not always allocated to an optimum location. For this reason, after completing the data migration, an instruction to the storage apparatus 10c to migrate data in the storage apparatus is issued to realize a data allocation according to the created data relocation plan. At this time, when the data migration source and migration destination are overlapped in the storage apparatus 10c, the system once migrates the data to an empty area different from the migration destination and thereafter, the storage apparatus 10c performs the operation to migrate the data to the migration destination again specified.

In the data relocation plan creating operation, the data relocation work information 670 as a work area to be used at the time of creating the data relocation plan is changed to data relocation work information 670c, and the migration plan information 750 is changed to migration plan information 750c.

Figure 38:
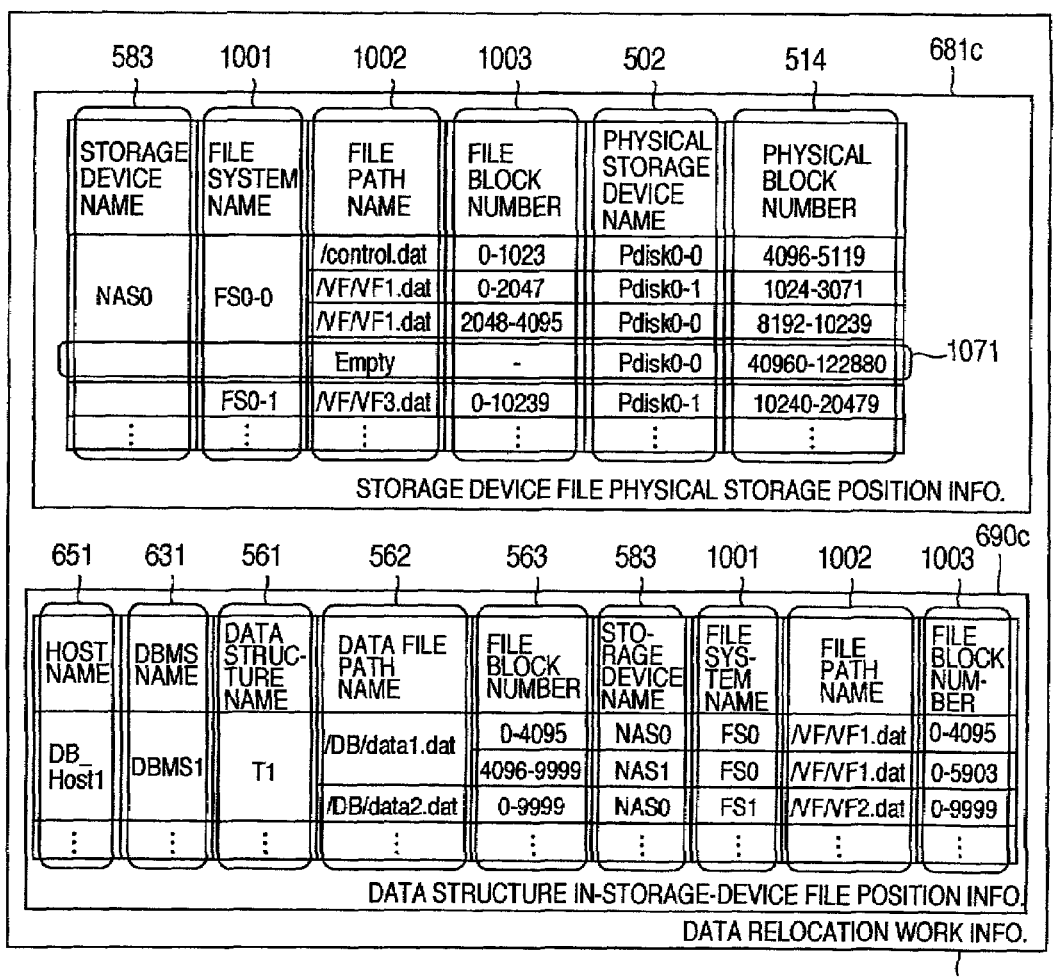
FIG. 38 shows data relocation work information 670*c* for use in the data allocation analysis/relocation plan creating operation.

FIG. 38 shows data relocation work information 670c. The data relocation work information 670c contains storage device file physical storage position information 681c and data structure storage-device file position information 690c. When compared to the data relocation work information 670 of FIG. 15, the virtual volume physical storage position information 680 is changed to the storage device file physical storage position information 681c, and the data structure virtual-volume position information 690 is changed to the data structure in-storage-device file position information 690c.

The storage device file physical storage position information 681c shows a list of file systems provided by the storage apparatus 10c, files present therein and storage positions in the storage device 18. The information 681c holds, as a set, a storage device name 583, a file system name 1001, a file path name 1002, a file block number 1003, a physical storage device name 502 and a physical block number 514. The data are initialized by referring to the storage device structure information 134c. An entry 1071 having the file path name 1002 of 'Empty' indicates one of areas having the file system name 1001 of the storage apparatus 10c and not used for file storage, and data migration can be carried out to the empty area.

The data structure storage-device file position information 690c indicates a location where the data structure held by the DBMS 110 is stored in the file provided by the storage apparatus 10c. The information 690c holds, as a set, a host name 651, a DBMS name 631, a data structure name 561, a data file path name 562, a file block number 563, a storage device name 583, a file system name 1001, a file path name 1002 and a file block number 1003. These data are initialized by referring the DBMS data storage position information 622, DBMS host information 626 and host mapping information 650c in the DBMS schema information 136 and by combining corresponding parts thereof relating to the file path.

FIG. 39 shows migration plan information 750c. The information 750c contains contains virtual file block migration plan information 755 storing a data migration instruction to the network file system 104c and physical storage position migration plan information 752 storing a data migration instruction to the storage apparatus 10c. These data are initialized so as not to have any data. When compared to the migration plan information 750 of FIG. 16, the migration plan information 750c has the physical storage position migration plan information 752 deleted therefrom, has the virtual file block migration plan information 755 added thereto, and has physical storage position migration plan information 752c to which the physical storage position migration plan information 752 was changed.

The virtual file block migration plan information 755 contains, as a set, a migration sequence 761, a host name 651 for migrating operation, a migration virtual file path name 1051 for specification of a virtual file of the migration source and its area, a migration virtual file block number 1052, a migration destination structure file path name 1053 for specification of a structure file of the migration destination and its area, and a migration destination file block number 1054. The physical storage position migration plan information 752c contains, as a set, a migration sequence 761, a migration storage device name 767 for migrating operation, a migration file system name 1101 for specification of the file of the migration source and its area, a migration file path name 1102, a migration file block number 1103, a migration destination physical storage device name 771 and migration destination physical block number 772 for specification of a storage device 18 as the migration destination and its area.

Although the network file system 104c is assumed to have a function of combining a plurality of files into a single virtual file in the present embodiment, the single virtual file may be made up of a simple single file. At this time, the network file system 104c provides only the dynamic data migration function. Further, when the DBMS 110 is allowed to interrupt its operation, such a data relocation can also be possible that, after the interrupted operation of the DBMS 110, file copy is carried out, a symbolic link is set so that accesses are directed to copy, and then the DBMS 110 resumes its operation. In addition, it is possible not to perform the data migration in the network file system 104c and for only the storage apparatus 10c to perform the data migration.

It will be further understood by those skilled in the art that the foregoing description has been made on embodiments of the invention and that various changes and modifications may be made in the invention without departing from the spirit of the invention and scope of the appended claims.

What is claimed is:

1. A data relocation method in a computer system comprising:
   at least one computer for operating a database management system;
   at least one storage apparatus for storing database data to be managed by said database management system, said storage apparatus including a plurality of physical storage devices;
   storage control means connected between said computer and said storage apparatus, for controlling transfer of database data between said computer and said storage apparatus; and a data position management server for managing positions of database data in said computer system, said method comprising the steps of:
  acquiring, by said data position management server, information a database to be managed by said database management system through said computer, said information on the database including table data and index data to said table data, with said index data having a tree-structure;
  determining, by said data position management server, relocation of database data in said computer system on the basis of the information on the database thus acquired;
  instructing, from said data position management server, said storage control means to migrate database data so as to prevent said storage control means from accessing said table data and said index data simultaneously in a same physical storage device; and
  changing, by said storage control means, allocation of database data so that said table data and said index data are stored in different physical storage devices, respectively, according to instruction from said data position management server.

2. A data relocation method in a computer system comprising:
  at least one computer for operating a database management system;
  at least one storage apparatus for storing database data to be managed by said database management system, said storage apparatus including a plurality of physical storage devices;
  storage control means connected between said computer and said storage apparatus, for controlling transfer of database data between said computer and said storage apparatus; and
  a data position management server for managing positions of database data in said computer system, said method comprising the steps of:
    acquiring, by said data position management server, information on a database to be managed by said database management system through said computer, said information on the database including log data and database data other than said log data;
    determining, by said data position management server, relocation of database data in said computer system on the basis of the information on the database thus acquired;
    instructing, from said data position management server, said storage control means to migrate database data so as to prevent said storage control means from accessing said log data and said database data other than said log data simultaneously in a same physical storage device; and
    changing, by said storage control means, allocation of database data so that said log data and said database data other than said log data are stored in different physical storage devices, respectively, according to instruction from said data position management server.

3. A computer system comprising:
  at least one computer for operating a database management system;
  at least one storage apparatus for storing database data to be managed by said database management system, said storage apparatus including a plurality of physical storage devices;
  a storage controller connected between said computer and said storage apparatus, for controlling transfer of database data between said computer and said storage apparatus; and
  a data position management server for managing positions of database data in said computer system,
  wherein said data position management server includes:
    an information acquisition section that acquires information on a database to be managed by said database management system through said computer, said information on the database including table data and index data to said table data, with said index data having a tree-structure;
    a relocation determination section that determines relocation of database data in said computer system on the basis of the information on the database thus acquired; and
    a data allocation instruction section that instructs said storage controller to migrate database data so as to prevent said storage controller from accessing said table data and said index data simultaneously in a same physical storage device; and
  wherein said storage controller includes a data allocation changer that changes allocation of database data so that said table data and said index data are stored in different physical storage devices, respectively, according to instruction from said data position management server.

4. A computer system comprising:
  at least one computer for operating a database management system;
  at least one storage apparatus for storing database data to be managed by said database management system, said storage apparatus including a plurality of physical storage devices;
  a storage controller connected between said computer and said storage apparatus, for controlling transfer of database data between said computer and said storage apparatus; and
  a data position management server for managing positions of database data in said computer system,
  wherein said data position management server includes:
    an information acquisition section that acquires information on a database to be managed by said database management system through said computer, said information on the database including log data and database data other than said log data;
    a relocation determination section that determines relocation of database data in said computer system on the basis of the information on the database thus acquired; and
    a data allocation instruction section that instructs said storage controller to migrate database data so as to prevent said storage controller from accessing said log data and database data other than said log data simultaneously in a same physical storage device, and
  wherein said storage controller includes a data allocation changer that changes allocation of database data so that said log data and database data other than said log data are stored in different physical storage devices, respectively, according to instruction from said data position management server.

5. A data relocation method in a computer system comprising at least one computer for operating a database management system, at least one storage apparatus for storing database data to be managed by said database management system, storage control means connected between said computer and said storage apparatus for controlling data transfer between said computer and said storage apparatus, and a data position management server for managing the data positions in said computer system, said method comprising the steps of:

acquiring information on a database to be managed by said database management system through said computer by said data position management server;

determining by said data position management server allocation of said database data in said computer system on the basis of acquisition information including said database information;

instructing said storage control means of data migration to realize said data allocation determined by said data position management server; and changing said data allocation stored in said storage apparatus by said storage control means according to said instruction, wherein said information on database contains at least one of information relating to a data structure including table, index, and log defined by a schema of said database management system and information relating to record positions of data of said database sorted according to the data structure defined by said schema in said storage apparatus, wherein said storage apparatus has at least one physical storage means for storing data therein, and said data position management server, at the time of determining said data allocation, determines a data allocation which specify a storage position in said physical storage means of said storage apparatus, wherein said data position management server has at least one physical storage means for storing data therein, said storage apparatus has logical/physical position conversion means for converting a logical position used by said computer to access said storage apparatus to a storage position of said physical storage means, and said data position management server acquires information including in-storage-apparatus logical/physical mapping information relating to mapping of logical/physical position from the storage apparatus having said logical/physical position conversion means, wherein at least one of the storage apparatuses having said logical/physical position conversion means has in-storage-apparatus data physical storage position change means for changing a storage position of data of said physical storage means corresponding to said logical position, said data position management server, at the time of instructing data migration to realize said determined data allocation, instructs said storage apparatus having said storage-apparatus data physical storage position change means of the data migration in said storage apparatus, and said storage apparatus changes the allocation of said data stored in said storage apparatus according to said instruction, wherein said data position management server detects a set of said database data to be simultaneously accessed with a high possibility on the basis of said acquisition information, and arranges said set in said physical storage means different therefrom, and wherein said data position management server acquires information including information about an execution history of operation of said database management system.

6. A data relocation method in a computer system comprising at least one computer for operating a database management system, at least one storage apparatus for storing database data to be managed by said database management system, storage control means connected between said computer and said storage apparatus for controlling data transfer between said computer and said storage apparatus, and a data position management server for managing the data positions in said computer system, said method comprising the steps of:

acquiring information on a database to be managed by said database management system through said computer by said data position management server;

determining by said data position management server allocation of said database data in said computer system on the basis of acquisition information including said database information;

instructing said storage control means of data migration to realize said data allocation determined by said data position management server; and changing said data allocation stored in said storage apparatus by said storage control means according to said instruction, wherein said information on database contains at least one of information relating to a data structure including table, index, and log defined by a schema of said database management system and information relating to record positions of data of said database sorted according to the data structure defined by said schema in said storage apparatus, wherein said storage apparatus has at least one physical storage means for storing data therein, and said data position management server, at the time of determining said data allocation, determines a data allocation which specify a storage position in said physical storage means of said storage apparatus, and wherein said database information includes information relating to a parallelism when said database management system accesses said database data belonging to the same data structure defined by said schema, and said data position management server arranges said database data belonging to the same data structure defined by said schema in a plurality of said physical storage means on the basis of said acquisition information.

7. A data relocation method in a computer system comprising at least one computer for operating a database management system, at least one storage apparatus for storing database data to be managed by said database management system, storage control means connected between said computer and said storage apparatus for controlling data transfer between said computer and said storage apparatus, and a data position management server for managing the data positions in said computer system, said method comprising the steps of:

acquiring information on a database to be managed by said database management system through said computer by said data position management server;

determining by said data position management server allocation of said database data in said computer system on the basis of acquisition information including said database information;

instructing said storage control means of data migration to realize said data allocation determined by said data position management server; and changing said data allocation stored in said storage apparatus by said storage control means according to said instruction, wherein said information on database contains at least one of information relating to a data structure including table, index, and log defined by a schema of said database management system and information relating to record positions of data of said database sorted according to the data structure defined by said schema in said storage apparatus, wherein said storage apparatus has at least one physical storage means for storing data therein, and said data position management server, at the time of determining said data allocation, determines a data allocation which specify a storage position in said physical storage means of said storage apparatus, and wherein said data position management server judges an access location and access order at the time of sequentially accessing said database data, and arranges said database data sequentially accessed in continuous areas while keeping a relationship of said continuous access order on said physical storage means.

8. A computer system including at least one computer for operating said database management system, at least one storage apparatus for storing database data to be managed by said database management system, storage control means connected between said computer and said storage apparatus for controlling data transfer between said computer and said storage apparatus, and a data position management server for managing the data positions in said computer system, said data position management server comprising:

information acquisition means for acquiring information on a database to be managed by said database management system through said computer by said data position management server;

allocation determination means for determining by said data position management server allocation of said database data in said computer system on the basis of acquisition information including said database information; and data allocation instruction means for instructing said storage control means of data migration to realize said data allocation determined by said data position management server, wherein said storage control means has data allocation change means for changing said data allocation stored in said storage apparatus by said storage apparatuses according to said instruction, wherein said database information includes at least one of information on a data structure including table, index, and log defined by the schema of said database management system and information on recorded positions of said database data in said storage apparatus sorted according to the data structure defined by said schema, wherein said storage apparatus has at least one physical storage means for storing at least one piece of data, and said allocation determination means determines the data allocation which specify storage position in said physical storage means of said storage apparatus, wherein said allocation determination means detects a set of said database data to be simultaneously accessed with a high possibility on the basis of said acquisition information and allocates said detected set in said physical storage means different therefrom, and wherein said database information includes information relating to an execution history of operation of said database management system.

9. A computer system including at least one computer for operating said database management system, at least one storage apparatus for storing database data to be managed by said database management system, storage control means connected between said computer and said storage apparatus for controlling data transfer between said computer and said storage apparatus, and a data position management server for managing the data positions in said computer system, said data position management server comprising:

information acquisition means for acquiring information on a database to be managed by said database management system through said computer by said data position management server;

allocation determination means for determining by said data position management server allocation of said database data in said computer system on the basis of acquisition information including said database information; and data allocation instruction means for instructing said storage control means of data migration to realize said data allocation determined by said data position management server, wherein said storage control means has data allocation change means for changing said data allocation stored in said storage apparatus by said storage apparatuses according to said instruction, wherein said database information includes at least one of information on a data structure including table, index, and log defined by the schema of said database management system and information on recorded positions of said database data in said storage apparatus sorted according to the data structure defined by said schema, wherein said storage apparatus has at least one physical storage means for storing at least one piece of data, and said allocation determination means determines the data allocation which specify storage position in said physical storage means of said storage apparatus, and wherein said database information includes information relating to a parallelism when the database management system accesses said database data belonging to an identical data structure defined by said schema, and said allocation determination means arranges said database data belonging to the identical data structure defined by said schema in a plurality of said physical storage means on the basis of said acquisition information.

10. A computer system including at least one computer for operating said database management system, at least one storage apparatus for storing database data to be managed by said database management system, storage control means connected between said computer and said storage apparatus for controlling data transfer between said computer and said storage apparatus, and a data position management server for managing the data positions in said computer system, said data position management server comprising:

information acquisition means for acquiring information on a database to be managed by said database management system through said computer by said data position management server;

allocation determination means for determining by said data position management server allocation of said database data in said computer system on the basis of acquisition information including said database information; and data allocation instruction means for instructing said storage control means of data migration to realize said data allocation determined by said data position management server, wherein said storage control means has data allocation change means for changing said data allocation stored in said storage apparatus by said storage apparatuses according to said instruction, wherein said database information includes at least one of information on a data structure including table, index, and log defined by the schema of said database management system and information on recorded positions of said database data in said storage apparatus sorted according to the data structure defined by said schema, wherein said storage apparatus has at least one physical storage means for storing at least one piece of data, and said allocation determination means determines the data allocation which specify storage position in said physical storage means of said storage apparatus, and wherein said allocation determination means judges an access location and an access order when said database management system sequentially accesses said database data on the basis of said acquisition information, and arranges the database data to be sequentially accessed in continuous areas while keeping a relationship of said continuous access order on said physical storage means.

* * * * *